(12) United States Patent
Yamada

(10) Patent No.: US 10,940,821 B2
(45) Date of Patent: Mar. 9, 2021

(54) AIRBAG DEVICE

(71) Applicant: TOYODA GOSEI CO., LTD., Kiyosu (JP)

(72) Inventor: Ikuo Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/677,834

(22) Filed: Nov. 8, 2019

(65) Prior Publication Data
US 2020/0156583 A1  May 21, 2020

(30) Foreign Application Priority Data
Nov. 16, 2018 (JP) .............................. JP2018-215884

(51) Int. Cl.
*B60R 21/205* (2011.01)
*B60R 21/2338* (2011.01)
*B60R 21/239* (2006.01)
*B60R 21/00* (2006.01)

(52) U.S. Cl.
CPC .......... *B60R 21/205* (2013.01); *B60R 21/239* (2013.01); *B60R 21/2338* (2013.01); *B60R 2021/0009* (2013.01); *B60R 2021/0023* (2013.01)

(58) Field of Classification Search
CPC ........................... B60R 21/205; B60R 21/2338
See application file for complete search history.

(56) References Cited

U.S. PATENT DOCUMENTS

| 8,070,183 | B2 * | 12/2011 | Kumagai | B60R 21/239 280/743.2 |
| 8,864,170 | B2 * | 10/2014 | Yamada | B60R 21/2338 280/743.2 |
| 9,187,055 | B1 * | 11/2015 | Genthikatti | B60R 21/233 |
| 9,796,354 | B1 * | 10/2017 | Hayashi | B60R 21/235 |
| 2008/0211214 | A1 | 9/2008 | Ishiguro et al. | |
| 2012/0074677 | A1 * | 3/2012 | Hiruta | B60R 21/2338 280/739 |
| 2019/0299913 | A1 * | 10/2019 | Tanaka | B60R 21/2338 |
| 2020/0086821 | A1 * | 3/2020 | Nakajima | B60R 21/205 |

FOREIGN PATENT DOCUMENTS

| JP | 2008-179231 A | 8/2008 |
| JP | 2018-114947 A | 7/2018 |

* cited by examiner

*Primary Examiner* — Faye M Fleming
(74) *Attorney, Agent, or Firm* — Posz Law Group, PLC

(57) ABSTRACT

An airbag includes a bag body, an exhaust portion which has an exhaust hole, and a connecting member which is connected to the exhaust portion by the root portion inside the bag body. The bag body includes a main inflatable portion that includes a first and a second side walls which are opposed in a left and right direction at airbag deployment, and a protruding inflatable portion that protrudes partially rearward from a first end region in the left and right direction of an upper region of a rear portion of the main inflatable portion as deployed. The exhaust portion is formed in the first side wall of the main inflatable portion on a side the protruding inflatable portion is disposed, and is positioned farther downward than an apex of the protruding inflatable portion, as viewed from a side of the airbag as deployed.

7 Claims, 14 Drawing Sheets

AIRBAG DEVICE

CROSS REFERENCE TO RELATED APPLICATIONS

The Present application claims priority from Japanese Patent Application No. 2018-215884 of Yamada, filed on Nov. 16, 2018, the entire disclosure of which is incorporated herein by reference.

BACKGROUND

1. Technical Field

The present invention relates to an airbag device including an airbag which is housed in a storage in a folded-up configuration and deployable when fed with an inflation gas.

2. Description of Related Art

JP 2018-114947 A discloses a known airbag device whose airbag includes a protruding inflatable portion that protrudes partially rearward from a first end portion in a left and right direction of the rear portion of the airbag for protecting a head of a vehicle occupant which moves diagonally forward in the event of an oblique collision or an offset collision of the vehicle.

JP 2008-179231 A discloses another known airbag device that includes an exhaust hole in its airbag and an open/close control device which controls opening and closing of the exhaust hole in accordance with a physical size of a vehicle occupant and/or his sitting position for controlling an internal pressure of the airbag. In this airbag device, the exhaust hole is disposed in an exhaust portion of the airbag, and the exhaust portion is connected to the open/close control device by a connecting member. The exhaust portion is configured either to be pulled inside a bag body and stay closed when the bag body is inflated with the connecting member connected to the open/close control device, or to protrude from the bag body and open the exhaust hole when the bag body is inflated with the connecting member released from the open/close control device.

When an exhaust portion like the one disclosed in the latter reference is desired to be applied to an airbag like the one disclosed in the former reference, it would not be easy to form the exhaust portion simply at a position of a vent hole disposed in a front region of a side wall of the airbag in front of the protruding inflatable portion as in the airbag disclosed in the former reference, because a protrusion of the exhaust portion would cause an abrupt increase of film length of the front region of the side wall of the airbag, and this would be likely to cause oscillation in the left and right direction in the protruding inflatable portion, i.e., likely to lead to a failure of rearward deployment of the protruding inflatable portion.

It would be desirable to provide an airbag device in which an airbag includes an exhaust hole which is controllable in opening/closing for controlling the internal pressure at deployment, and the airbag is also able to be completely inflated quickly.

SUMMARY

An exemplary embodiment of the invention relates to an airbag device that includes a storage and an airbag that is housed in the storage in a folded-up configuration and configured to be inflated with an inflation gas and emerge from the storage. The airbag includes:

a bag body that has flexibility and includes an inlet port for admitting the inflation gas, and a peripheral region of the inlet port which is mounted on the storage;

an exhaust portion that includes an exhaust hole which is configured to release a part of the inflation gas which has flown into the bag body; and a connecting member that is disposed inside the bag body and connected to the exhaust portion by the root portion.

The airbag device further includes an open/close control device that is disposed in or in a vicinity of the storage and in a vicinity of the inlet port of the airbag. A leading end portion of the connecting member is connected to the open/close control device in a disengageable fashion.

The bag body of the airbag includes:

a main inflatable portion that has the inlet port in the front end portion as deployed, the main inflatable portion including a first and a second side walls which are configured to be opposed in a left and right direction at airbag deployment; and a protruding inflatable portion that is configured to partially protrude rearward from a first end region in the left and right direction of an upper region of a rear portion of the main inflatable portion as deployed for protecting a head of a vehicle occupant who moves diagonally forward in the event of an oblique collision or an offset collision of the vehicle.

The open/close control device is configured either to keep the exhaust hole of the exhaust portion closed during airbag deployment by keeping holding the connecting member such that the connecting member pulls in the exhaust portion inside the bag body such that walls in a circumference of the exhaust hole are pressed against each other so as to keep the exhaust hole closed, or to open the exhaust hole by releasing the connecting member such that the exhaust portion protrudes from the bag body and the exhaust hole is opened.

The exhaust portion is formed in the first side wall of the main inflatable portion on a side the protruding inflatable portion is disposed, and is positioned farther downward than an apex of the protruding inflatable portion, as viewed from a side of the airbag as deployed.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Especially, in the following detailed description, for purposes of explanation, numerous specific details are set forth in order to provide a thorough understanding of the disclosed embodiments. It will be apparent, however, that one or more embodiments may be practiced without these specific details.

Figure 1:
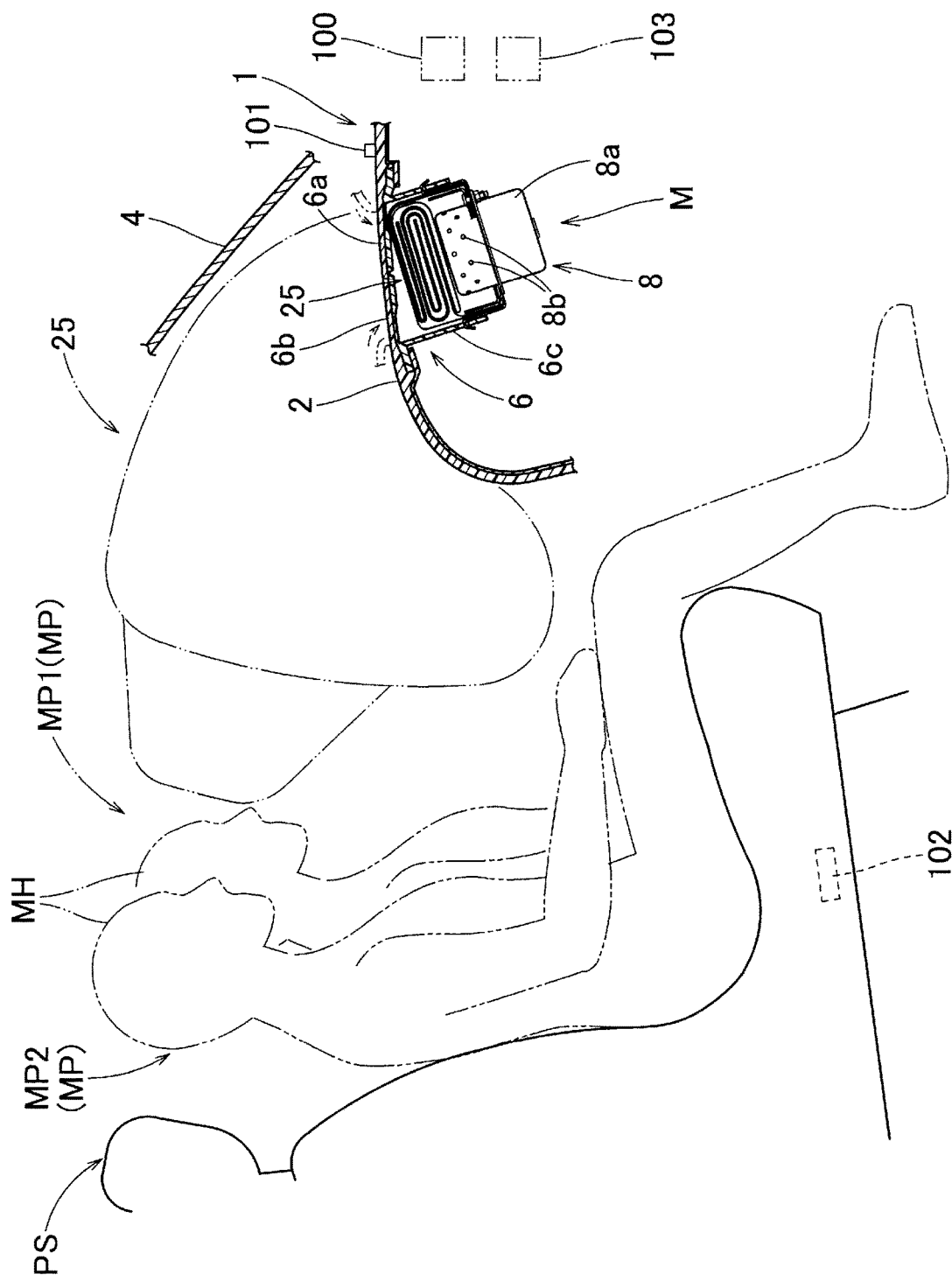
FIG. 1 schematically depicts an area an airbag device for a passenger seat in accordance with an exemplary embodiment is disposed.
Figure 8:
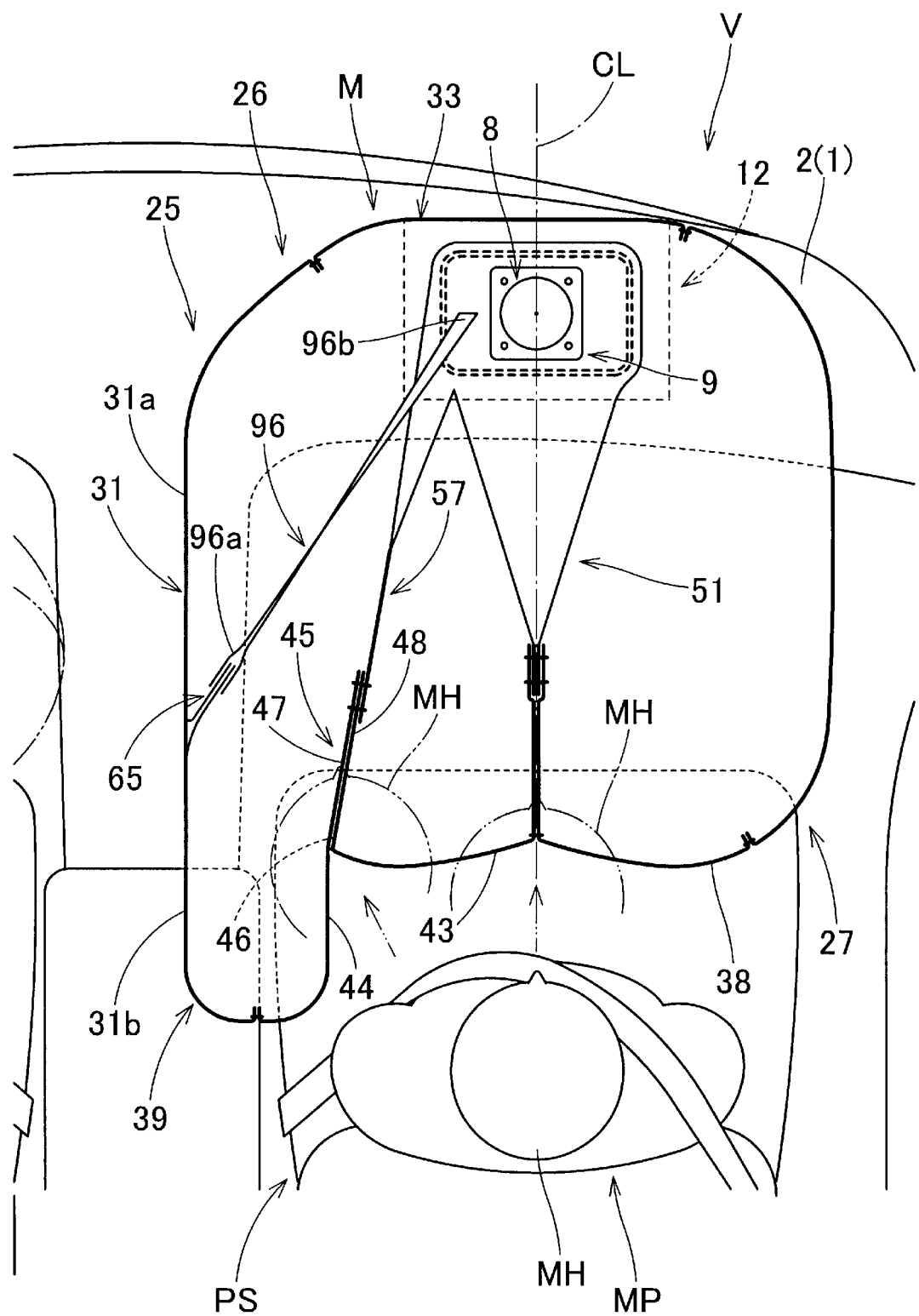
FIG. 8 is a schematic horizontal sectional view of the airbag device of the exemplary embodiment as the airbag is completely deployed.

FIGS. 1 and 8 illustrate an airbag device according to an exemplary embodiment as an airbag device M for a front passenger seat. The airbag device M is a top-mount airbag device which is stored inside a top plane 2 of an instrument panel or dashboard 1 of a vehicle V in front of a passenger seat PS. Unless otherwise specified, front-rear, up-down and left-right directions in this specification are intended to refer to front-rear, up-down and left-right directions of the vehicle V.

Figure 2:
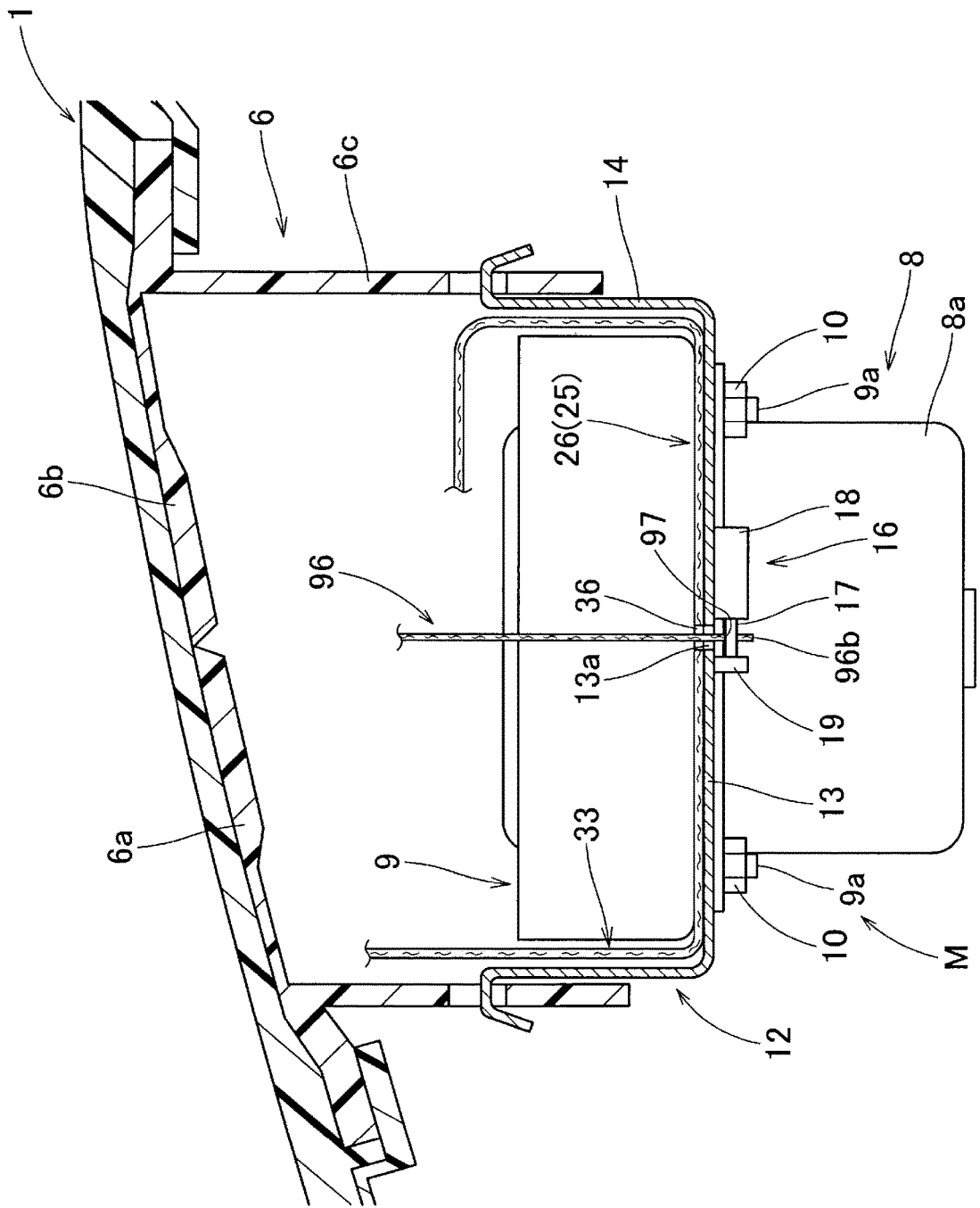
FIG. 2 is a schematic enlarged sectional view of the airbag device of FIG. 1 taken along a front and rear direction.

As shown in FIGS. 1 and 2, the airbag device M includes an airbag 25, which is folded up, an inflator 8 for supplying the airbag 25 with an inflation gas, a case or storage 12 which stores and holds the airbag 25 and inflator 8, a retainer 9 which is used for mounting the airbag 25 and inflator 8 on the case 12, an airbag cover 6 which covers the airbag 25 from above, and a retaining member 16 which serves as an open/close control device for controlling opening and closing of a later-described exhaust portion 65 formed in the airbag 25. In this specific embodiment, operations of the inflator 8 and retaining member 16 are under control of a control device 100 depicted in FIG. 1.

As shown in FIG. 1, the control device 100 is electrically connected with a position sensor 101 for sensing a physical size of a vehicle occupant MP sitting in the passenger seat PS and a distance between the dashboard 1 and the occupant MP, and a weight sensor 102 for sensing a weight of the occupant MP. The control device 100 is also electrically connected with a collision sensor 103 for detecting an acceleration of the vehicle V and its direction. The control device 100 actuates the inflator 8 in response to an electric signal fed from these sensors, as well as controls operation of the retaining member 16 such that the airbag 25 is inflated in a preferable inflated mode.

The airbag cover 6 is integral with the dashboard 1 which is made from synthetic resin, and includes two doors, i.e. front and rear doors 6a and 6b, which are designed to open when pushed by the airbag 25 upon airbag deployment. The airbag cover 6 further includes, around the doors 6a and 6b, a joint wall 6c which is coupled to the case 12.

As shown in FIGS. 1 and 2, the inflator 8 includes a main body 8a which is formed into a generally pot-like shape and provided with a plurality of gas discharge ports 8b, and a flange 8c for mounting on the case 12. The inflator 8 of the illustrated embodiment is designed to be actuated in the event of a frontal collision, an oblique collision or an offset collision of the vehicle V, under control of the control device 100.

As shown in FIGS. 1 and 2, the case 12 is made of sheet metal into a generally rectangular parallelepiped with a rectangular opening at the top, and includes a generally rectangular bottom wall 13 which the inflator 8 is inserted into and mounted on from below, and a circumferential wall 14 which extends upward from an outer circumferential edge of the bottom wall 13 and is joined with the joint wall 6c of the airbag cover 6. The airbag 25 and inflator 8 in the illustrated embodiment are secured to the bottom wall 13 of the case 12 through the use of bolts 9a of the retainer 9 serving as mounting means. More specifically, the retainer 9 is located inside the airbag 25 such that the bolts 9a go through a periphery of a later-described gas inlet port 34 of the airbag 25, the bottom wall 13 of the case 12 and the flange 8c of the inflator 8, then the bolts 9a are fastened with nuts 10. Thus the airbag 25 and inflator 8 are mounted on the bottom wall 13 of the case 12. The bottom wall 13 of the case 12 has a width in a left and right direction greater than a width in a front and rear direction (FIG. 8), and includes an insert hole for receiving the main body 8a of the inflator 8 and a plurality of apertures for receiving the bolts 9a of the retainer 9 generally at the center in the left and right direction. The bottom wall 13 further includes, on the left of the insert hole for receiving the main body 8a of the inflator 8, a through hole or slot 13a for receiving a leading end 96b region of a later-described connecting member 96, as shown in FIG. 2. Moreover, not-shown brackets are provided on the bottom wall 13 of the case 12 for mounting on the vehicle body structure.

The retaining member 16 serving as the open/close control device is disposed on an underside of the bottom wall 13, in a vicinity of the slot 13a (on the left side of the inflator 8, in this specific embodiment). The retaining member 16 anchors the leading end 96b region of the connecting member 96 extending from the airbag 25. As shown in FIG. 2, the retaining member 16 includes an anchor pin 17 which goes through a retaining hole 97 formed in the leading end 96b region of the connecting member 96 and anchors the leading end 96b region of the connecting member 96, an actuator 18 which is attached to the underside of the bottom wall 13 of the case 12 and configured to operate to retract the anchor pin 17, and a support bracket 19 which extends downward from the bottom wall 13 and supports a leading end region of the anchor pin 17. The actuator 18 is configured to retract the anchor pin 17 in response to an actuating signal fed from the control device 100. When the actuator 18 retracts the anchor pin 17, the pin 17 stops retaining the leading end 96b region of the connecting member 96 and releases the connecting member 96. The actuator 18 can be configured of any of a piston cylinder making use of fluid pressure such as hydraulic pressure, water pressure, air pressure, or pressure of a gas which is generated by a gas generator or the like, a motor utilizing such fluid pressure as described above or electricity, an electromagnetic solenoid, a spring which would exert biasing force when restoring, or the like, provided that it can move the anchor pin 17 in response to an electric signal fed from the control device 100. When the actuator 18 is not in service, the leading end of the anchor pin 17 is supported by the support bracket 19 such that the anchor pin 17 keeps anchoring the leading end 96*b* region of the connecting member 96.

Figure 3:
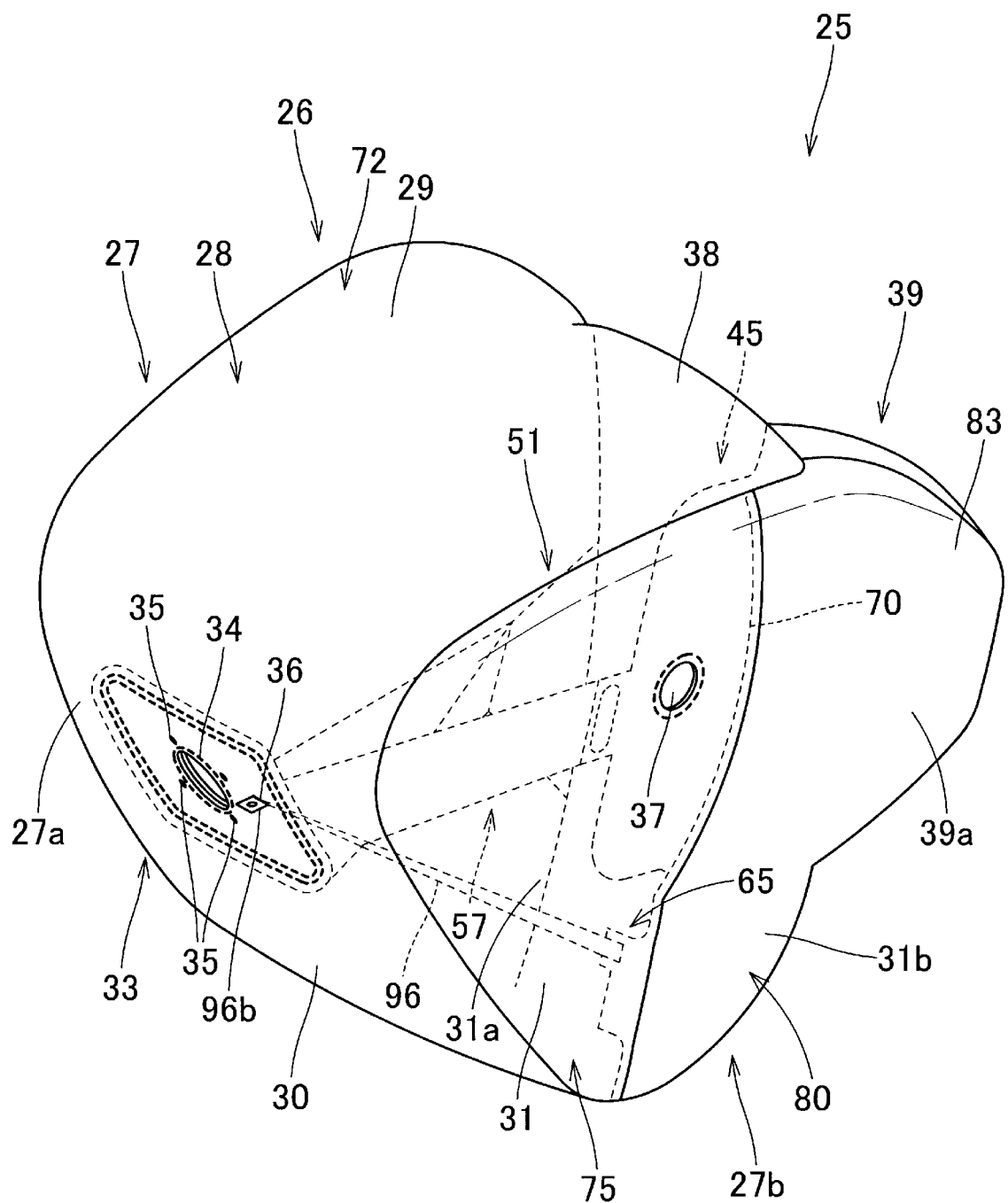
FIG. 3 is a perspective view of an airbag for use in the airbag device of FIG. 1 as inflated by itself.
Figure 4:
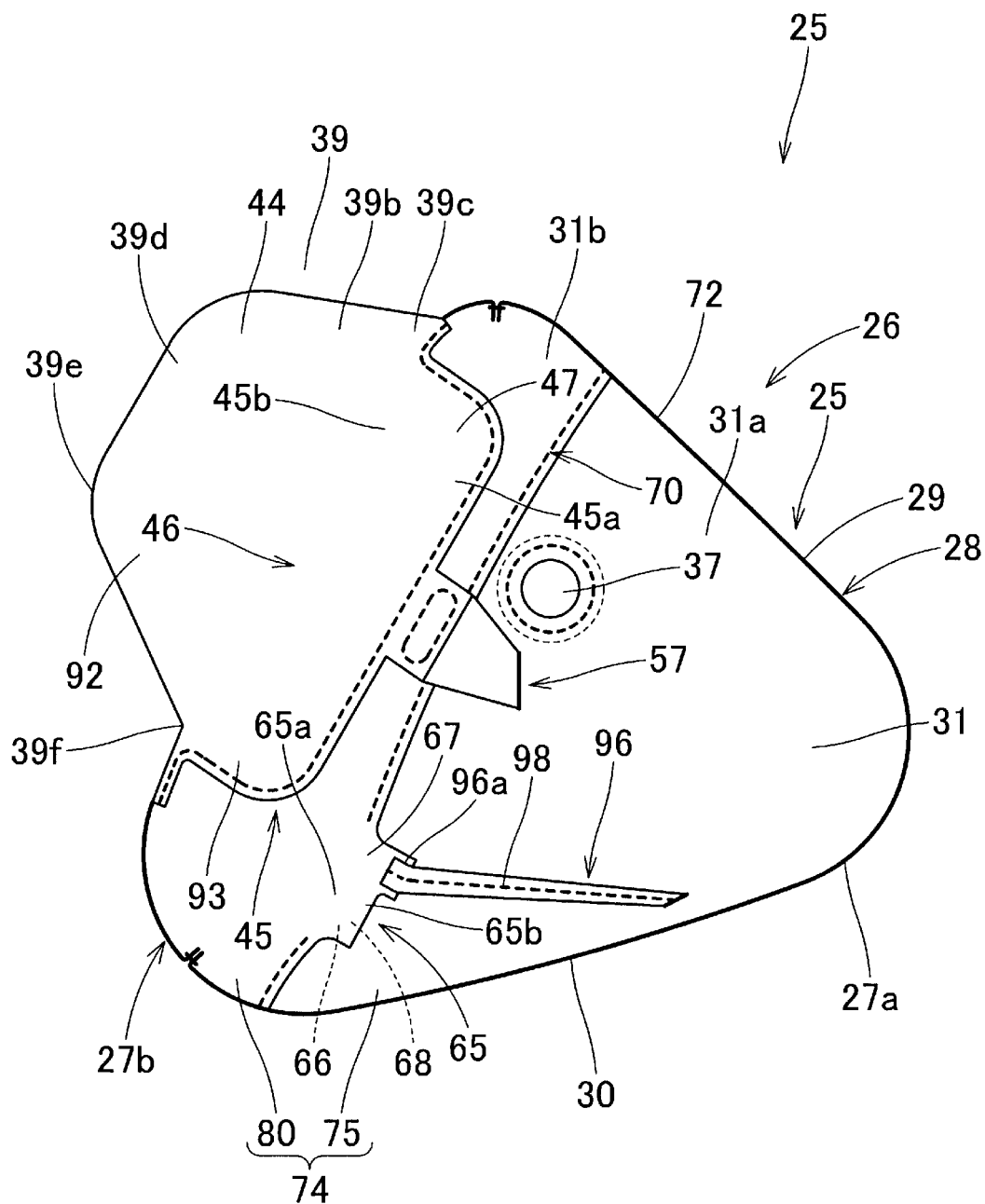
FIG. 4 is a schematic vertical sectional view of the airbag of FIG. 3 taken at the location of an arresting recess.
Figure 5:
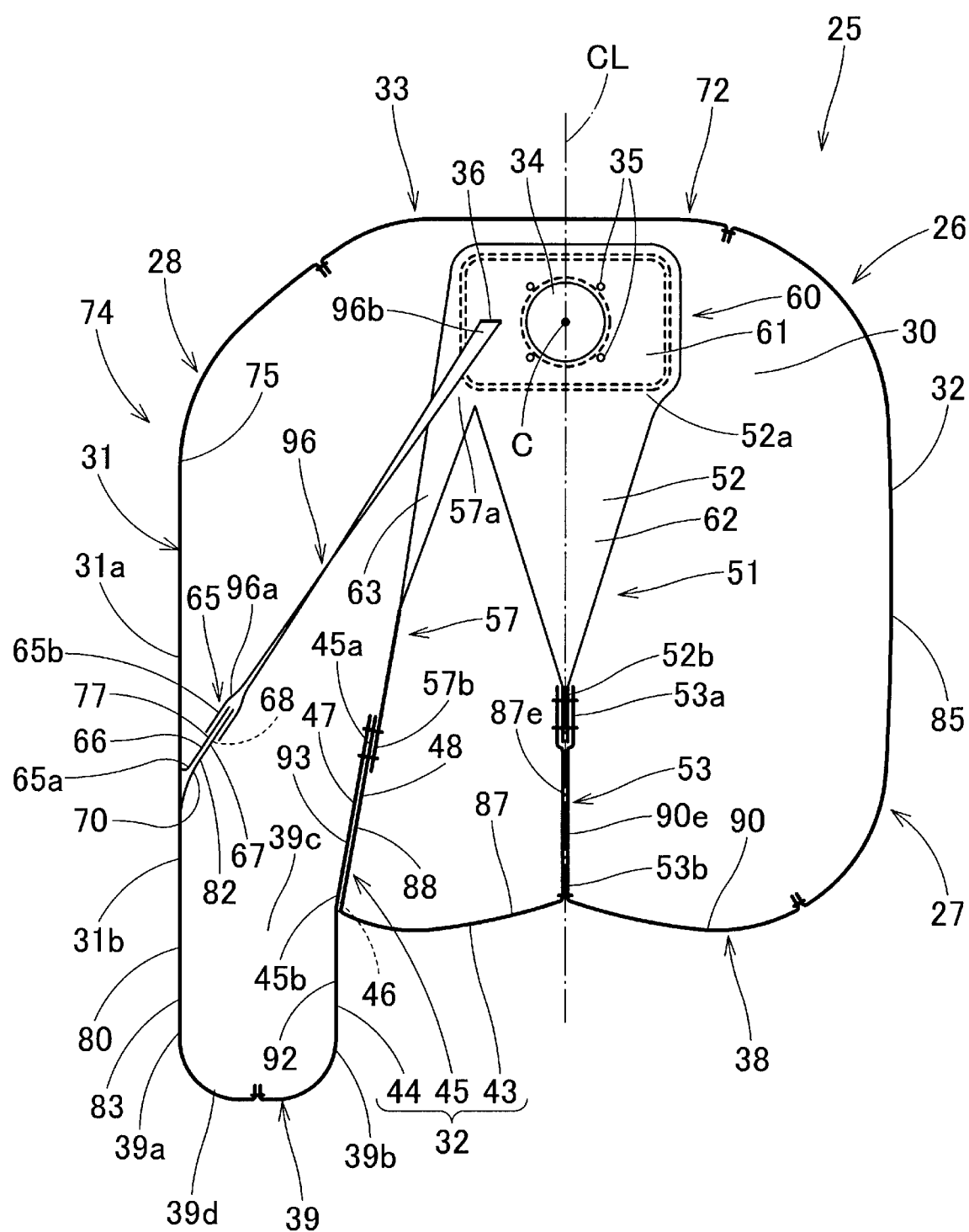
FIG. 5 is a schematic horizontal sectional view of the airbag of FIG. 3.

Referring to FIGS. 3 to 5, the airbag 25 includes a bag body 26, an exhaust portion 65 which is provided with an exhaust hole 68, tethers 51 and 57 which are disposed inside the bag body 26 for controlling the contour of the bag body 26 as fully inflated, and a connecting member 96 which is disposed inside the bag body 26 and is connected to the exhaust portion 65 by the root region 96*a*.

The bag body 26 is fabricated of a sheet material having flexibility. As shown in FIGS. 3 to 5, the bag body 26 of the illustrated embodiment includes a main inflatable portion 27 and a protruding inflatable portion 39 which is deployable in such a manner as to protrude rearward from the rear portion of the main inflatable portion 27 partially.

The main inflatable portion 27 is designed to be so deployed as to stuff a space between the top plane 2 of the dashboard 1 and the windshield 4. More specifically, as shown in FIG. 3, the main inflatable portion 27 is designed to be inflated into a generally triangular prism elongated generally in the left and right direction. As shown in FIG. 5, the main inflatable portion 27 includes a mounting region 33 in the front end 27*a* as deployed, by which mounting region 33 the main inflatable portion 27 is mounted on the case 12. That is, in the airbag 25 of the illustrated embodiment, the main inflatable portion 27 is mounted on the case 12 by the front end 27*a* region with the left region slightly protruding towards the left (i.e. towards the driver's seat) at airbag deployment, as shown in FIG. 8. The main inflatable portion 27 includes a rear side wall 38 which is deployable at the rear to face an occupant MP and a circumferential wall 28 which extends forward from the circumferential edge of the rear side wall 38 towards the front end 27*a* while narrowing in the up and down direction.

The circumferential wall 28 is designed to be deployed mainly between the top plane 2 of the dashboard 1 and the windshield 4, and includes an upper wall 29 and a lower wall 30 which are opposed to each other in the up and down direction, and a left side wall 31 and a right side wall 32 which are opposed to each other in the left and right direction, respectively at airbag deployment. In the airbag 25 of the illustrated embodiment, a front end region of the circumferential wall 28 as deployed serves as the mounting region 33 at which the airbag 25 is mounted on the case 12. The mounting region 33 as fully inflated is greater in width in the left and right direction than the case 12, as shown in FIG. 8. The mounting region 33 is provided, at its lower portion, i.e. in the lower wall 30, with a generally round gas inlet port 34 for admitting an inflation gas, and a plurality of (four, in the illustrated embodiment) mounting holes 35 that are disposed in the periphery of the gas inlet port 34 for receiving the bolts 9*a* of the retainer 9. By being secured to the case 12 by the periphery of the gas inlet port 34, the airbag 25 is mounted on the case 12 by the mounting region 33. In the illustrated embodiment, the inlet port 34 is disposed slightly to the right of the center in the left and right direction of the mounting region 33. As shown in FIG. 8, in the illustrated embodiment, the airbag 25 is secured to the case 12 and mounted on the vehicle V such that a mounting center C (FIG. 5), i.e. the center of the inlet port 34, generally falls on the center in the left and right direction of the passenger seat PS. A line which runs through the mounting center C in the front and rear direction will be called hereinafter a center line CL, as can be seen in FIG. 8. On the left side of the inlet port 34, there is formed a slot-like insertion hole 36 for receiving the leading end 96*b* region of the connecting member 96. The insertion hole 36 extends generally in the left and right direction. Further, each of the left side wall 31 and right side wall 32 of the circumferential wall 28 is provided with a vent hole 37 for releasing an extra inflation gas.

The rear side wall 38 is designed to be deployed generally vertically in the rear portion of the airbag 25 to face the passenger seat PS. The protruding inflatable portion 39 is disposed in a left or right end region of the rear side wall 38 (in the left end region towards the driver' seat, in the illustrated embodiment) in such a manner as to protrude rearward partially.

The protruding inflatable portion 39 is located in an upper region of the rear portion of the main inflatable portion 27 as deployed. The protruding inflatable portion 39 of the illustrated embodiment is designed to be deployed diagonally forward left of the occupant MP sitting in the passenger seat PS, as can be seen in FIG. 8. The protruding inflatable portion 39 is in gas communication with the main inflatable portion 27 at the front end 39*c* as deployed, such that an inflation gas is fed to the protruding inflatable portion 39 via the main inflatable portion 27, as can be seen in FIG. 5. The protruding inflatable portion 39 is deployable into such a generally board-like contour that has a thickness in the left and right direction, and is trapezoidal as viewed from the left and right direction. More particularly, an outer contour of the protruding inflatable portion 39 as fully inflated is such a trapezoid that narrows towards the rear end 39*d* from the front end 39*c* (i.e. from the main inflatable portion 27) as viewed from the left and right direction, as shown in FIG. 4. The protruding inflatable portion 39 includes a left side wall 39*a* and a right side wall 39*b* which are opposed to each other in the left and right direction as deployed. The left side wall 39*a* is continuous with the left side wall 31 of the circumferential wall 28 of the main inflatable portion 27, as shown in FIG. 5. External dimensions of the protruding inflatable portion 39 (i.e. a width in the up and down direction and a width in the front and rear direction, which equals to a protruding amount from the rear side wall 38) are so determined as to arrest the head MH of the occupant MP adequately and guide the head MH into a later-described arresting recess 45 smoothly when, at airbag deployment, the head MH bumps the right side wall 39*b* (i.e. a later-described oblique-collision arresting plane 44) as he moves diagonally forward.

In the airbag 25 of the illustrated embodiment, the rear portion as inflated constitute an occupant protection region 42 which protects the occupant MP. Specifically, the protruding inflatable portion 39 and the rear side wall 38 of the main inflatable portion 27 constitute the occupant protection region 42. The occupant protection region 42 includes a front-collision arresting plane 43 that is designed to protect the head MH of the occupant MP which moves forward in the event of a frontal collision of the vehicle V, an oblique-collision arresting plane 44 that is designed to protect the occupant's head MH which moves diagonally forward in the event of an oblique collision or an offset collision of the vehicle V, and an arresting recess 45 that is formed between the front-collision arresting plane 43 and the oblique-collision arresting plane 44 for receiving and arresting the occupant's head MH therein.

In the illustrated embodiment, the front-collision arresting plane 43 is composed of an upper area of the rear side wall 38. In other words, the front-collision arresting plane 43 is composed of an area of the rear side wall 38 in the airbag 25 as inflated positioned on the right side of the protruding inflatable portion 39. That is, the front-collision arresting plane 43 includes an area extending towards the left (i.e. towards the driver's seat) from the center line CL which runs through the mounting center C in the front and rear direction and an area extending towards the right (i.e. away from the driver's seat) from the center line CL, as shown in FIG. 5, so as to smoothly protect the head MH of the occupant MP which moves forward in the event of a frontal collision. The front-collision arresting plane 43 of the illustrated embodiment is configured such that a central portion in the left and right direction which falls on the center line CL is slightly recessed forward at airbag deployment, as shown in a cross sectional view taken along the front and direction in FIG. 5.

The oblique-collision arresting plane 44 is composed of the right side wall 39b of the protruding inflatable portion 39 which is continuous with the front-collision arresting plane 43 (i.e. rear side wall 38). That is, the oblique-collision arresting plane 44 protrudes rearward from the front-collision arresting plane 43. In the illustrated embodiment, the oblique-collision arresting plane 44 is formed only on the left side of the front-collision arresting plane 43 (i.e. on a side towards the driver's seat). As shown in FIG. 5, the oblique-collision arresting plane 44 is designed to be deployed generally along the front and rear direction. The lower area of the rear side wall 38 of the airbag 25 serves as a portion for catching mainly the thorax of the occupant MP when the occupant protection region 42 arrests the head MH of the occupant MP in the event of frontal collision, oblique collision or offset collision.

The arresting recess 45 formed between the front-collision arresting plane 43 and oblique-collision arresting plane 44 is provided for receiving and arresting therein the head MH of the occupant MP. In the illustrated embodiment, the arresting recess 45 is formed generally along the up and down direction at the boundary of a right region of the protruding inflatable portion 39 and the rear side wall 38 of the main inflatable portion 27, in such a manner that is open at the rear end 45b and recessed forward like a pocket, as can be seen in FIGS. 4 and 5. The arresting recess 45 includes a left side wall 47 and a right side wall 48 each of which has a generally rectangular shape elongated in the up and down direction when viewed from the left and right direction. The arresting recess 45 is formed by joining (sewing) together upper edges, lower edges and front edges of the left side wall 47 and right side wall 48, thus having a pocket-like shape opening at the rear end 45b, as shown in FIGS. 4 and 5. The length in the up and down direction, i.e. the opening width, of the arresting recess 45 is such as to admit the occupant's head MH smoothly. The width in the front and rear direction (i.e. depth) of the arresting recess 45 is such as to accommodate a front region of the occupant's head MH.

In the illustrated embodiment, the bag body 16 is internally provided with a recess-pulling tether 57 which is jointed to the leading end (i.e. the front end 45a) of the arresting recess 45. The recess-pulling tether 57 pulls the leading end (i.e. the front end 45a) of the arresting recess 45 forward at airbag deployment, as shown in FIG. 5. More specifically, pulled by the recess-pulling tether 57, the arresting recess 45 of the illustrated embodiment is deployed such that the left side wall 47 and right side wall 48 are brought into contact with each other generally wholly so the rear end 45b (or an opening 46) is held from gaping open, as shown in FIG. 5, and is deployed slightly at a slant with respect to the front and rear direction in such a manner as to continue from the right side wall 39b of the protruding inflatable portion 39 and point towards the right.

The recess-pulling tether 57 and another tether, a front-rear tether 51, are disposed inside the main inflatable portion 27 for controlling the shape of the bag body 26 as inflated, as shown in FIG. 5.

The front-rear tether 51 connects the generally central portion in the left and right direction of the front-collision arresting plane 43 and the front end 27a portion of the airbag 25 (i.e. the main inflatable portion 27). As shown in FIG. 5, the front-rear tether 51 is designed to be deployed on the center line CL, and is formed by jointing a front section 52 extending from the periphery of the inlet port 34 and a rear section 53 extending from the rear side wall 38.

Figure 7:
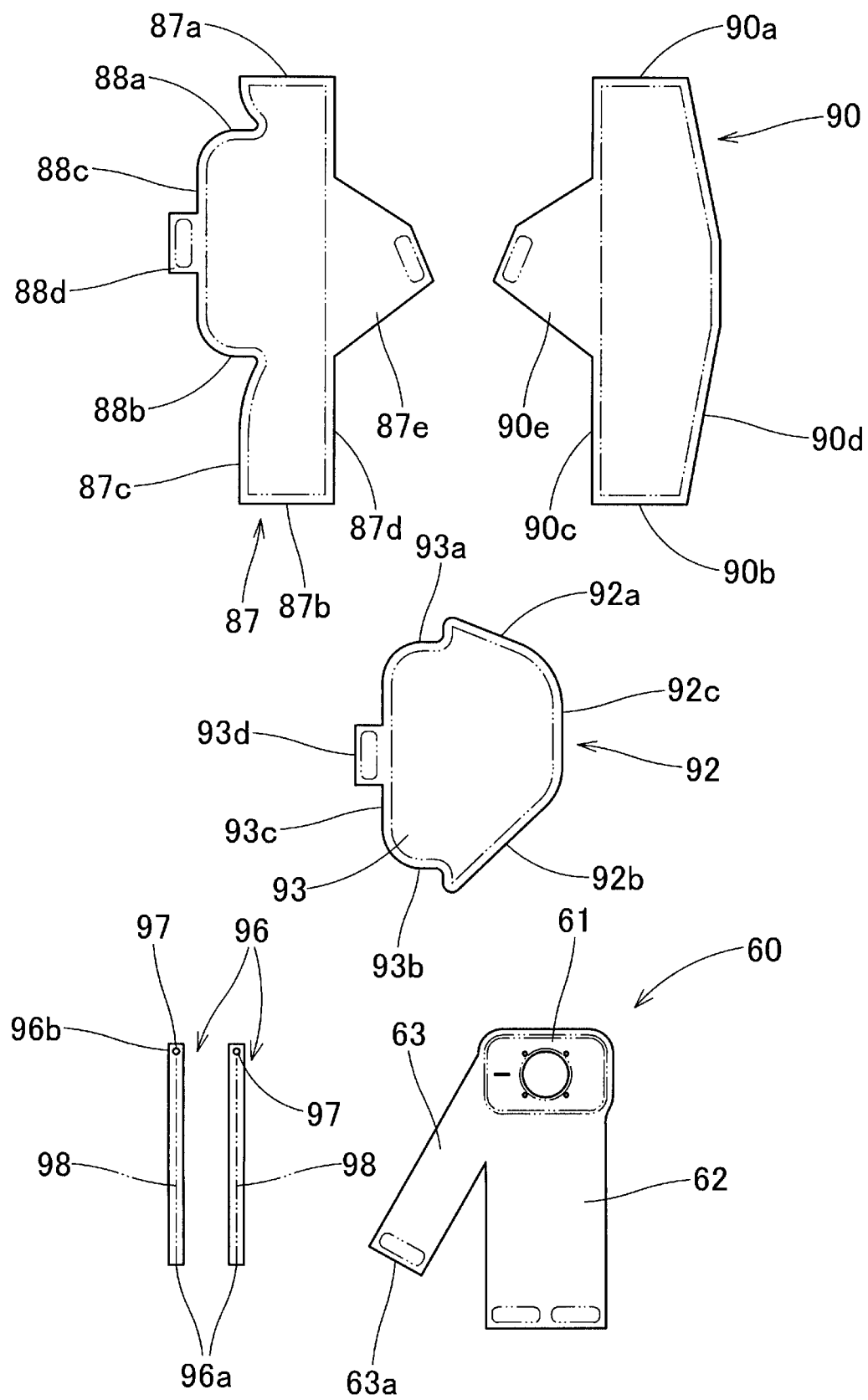

The front section 52 is composed of a base cloth 60 depicted in FIG. 7. The base cloth 60 also constitutes the recess-pulling tether 57, as described later. The base cloth 60 includes a joint region 61 which is shared by the tethers 51 and 57 and is to be joined to the periphery of the inlet port 34, a front-section base region 62 which is formed into a band extending rearward from the joint region 61 for forming the front section 52, and a pulling-tether base region 63 which is formed into a band extending diagonally rearward to the left for forming the recess-pulling tether 57. The front section 52 is formed by folding the front-section base region 62, and deployable in such a three dimensional shape approximate to a generally triangular pyramid that the front end portion 52a extends generally in the left and right direction and the rear end portion 52b extends generally in the up and down direction. The joint region 61 of the base cloth 60 includes openings (reference numerals omitted) corresponding to the inlet port 34, mounting holes 35 and insertion hole 36 of the bag body 26, and is to be joined to the periphery of the inlet port 34, in the lower portion of the mounting region 33 of the man inflatable portion 27.

The rear section 53 has a sheet shape, and extends from a vicinity of the center in the left and right direction of the rear side wall 38 of the main inflatable portion 27. The rear section 53 has such a trapezoidal outer shape that narrows towards the front end which is joined to the front section 52. The rear end of the rear section 53 is joined to the center in the left and right direction and in up and down direction of the rear side wall 38. In the illustrated embodiment, the rear section 53 is composed of an extended region 87e and an extended region 90e of a later-described rear left panel 87 and a later-described rear right panel 90 depicted in FIG. 7. Each of the extended regions 87e and 90e extends from a right edge 87d of the rear left panel 87/a left edge 90c of the rear right panel 90. That is, the rear section 53 has a double-wall structure of the extended regions 87e and 90e doubled in the left and right direction, as shown in FIG. 5.

The front-rear tether 51 joints the central portion in the left and right direction of the rear side wall 38, i.e. the central portion in the left and right direction of the front-collision arresting plane 43, and the periphery of the inlet port 34 (i.e. the front end 27a region of the main inflatable portion 27) at airbag deployment. The front-rear tether 51 prevents the front-collision arresting plane 43 from protruding unduly rearward in an initial stage of airbag deployment, and also prevents the front-collision arresting plane 43 as has completed deployment from moving farther rearward. In the illustrated embodiment, pulled by the front-rear tether 51, the portion of the rear side wall 38 on the center line CL is slightly sunken forward over a generally entire area in the up and down direction at airbag deployment, as shown in FIG. 5.

The recess-pulling tether 57 joints the leading end (front end 45*a*) of the arresting recess 45 and the front end portion of the airbag 25 (the front end 27*a* region of the main inflatable portion 27), as shown in FIG. 5. The recess-pulling tether 57 of the illustrated embodiment is composed of the pulling-tether base region 63 of the base cloth 60, as described above. The rear end 63*a* portion of the pulling-tether base region 63 is joined to the front end 45*a* of the arresting recess 45, thus the recess-pulling tether 57 is deployable at a slant with respect to the front and rear direction with the front end 57*a* disposed in the right side and the rear end 57*b* in the left side, as shown in FIG. 5. The recess-pulling tether 57 has such a length as to form a generally straight line together with the arresting recess 45 when pulling the arresting recess 45.

Figure 9:
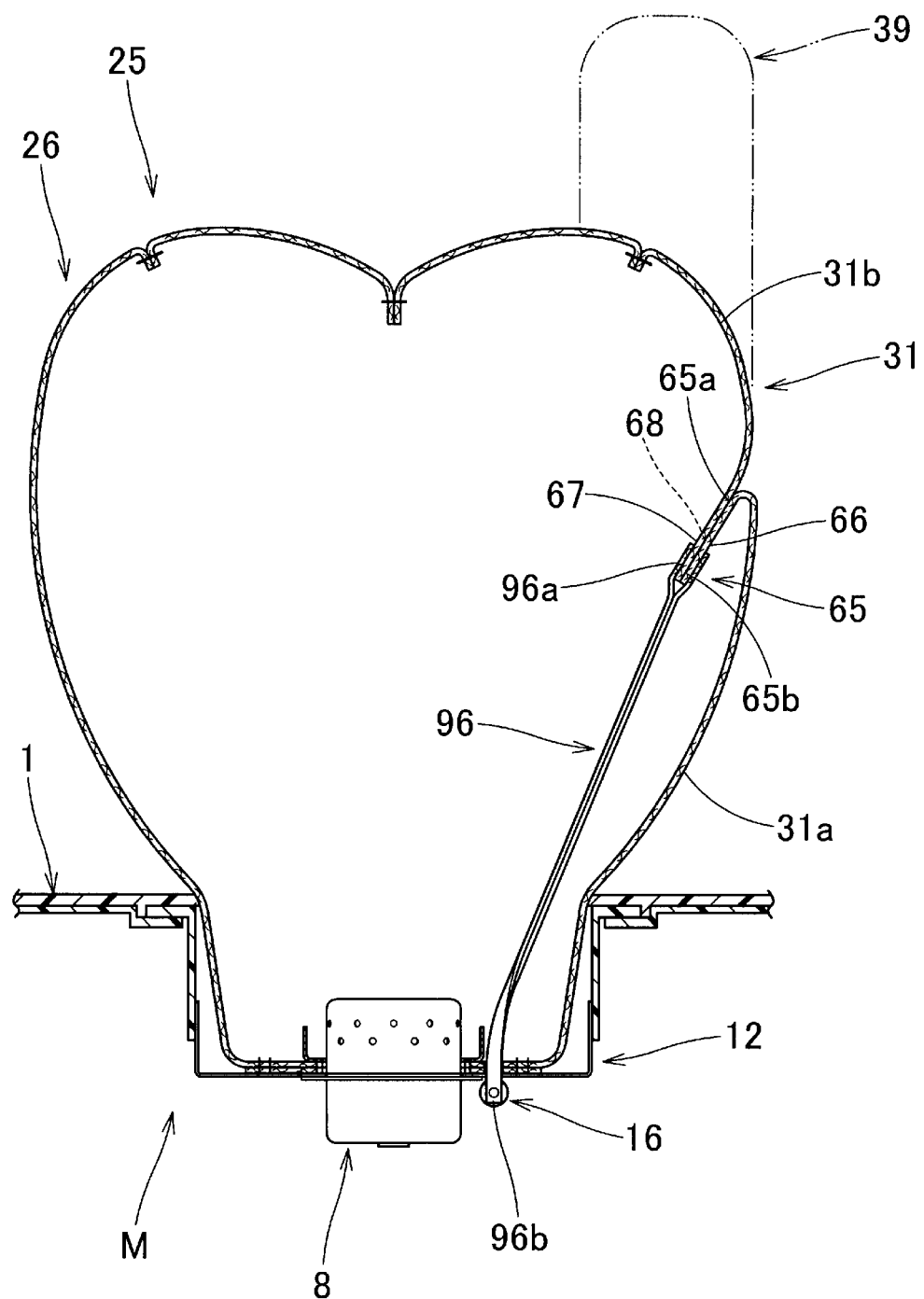
FIG. 9 is a schematic horizontal sectional view of the airbag device taken along the front and rear direction, which shows the way the airbag is completely inflated in a closed mode.
Figure 10:
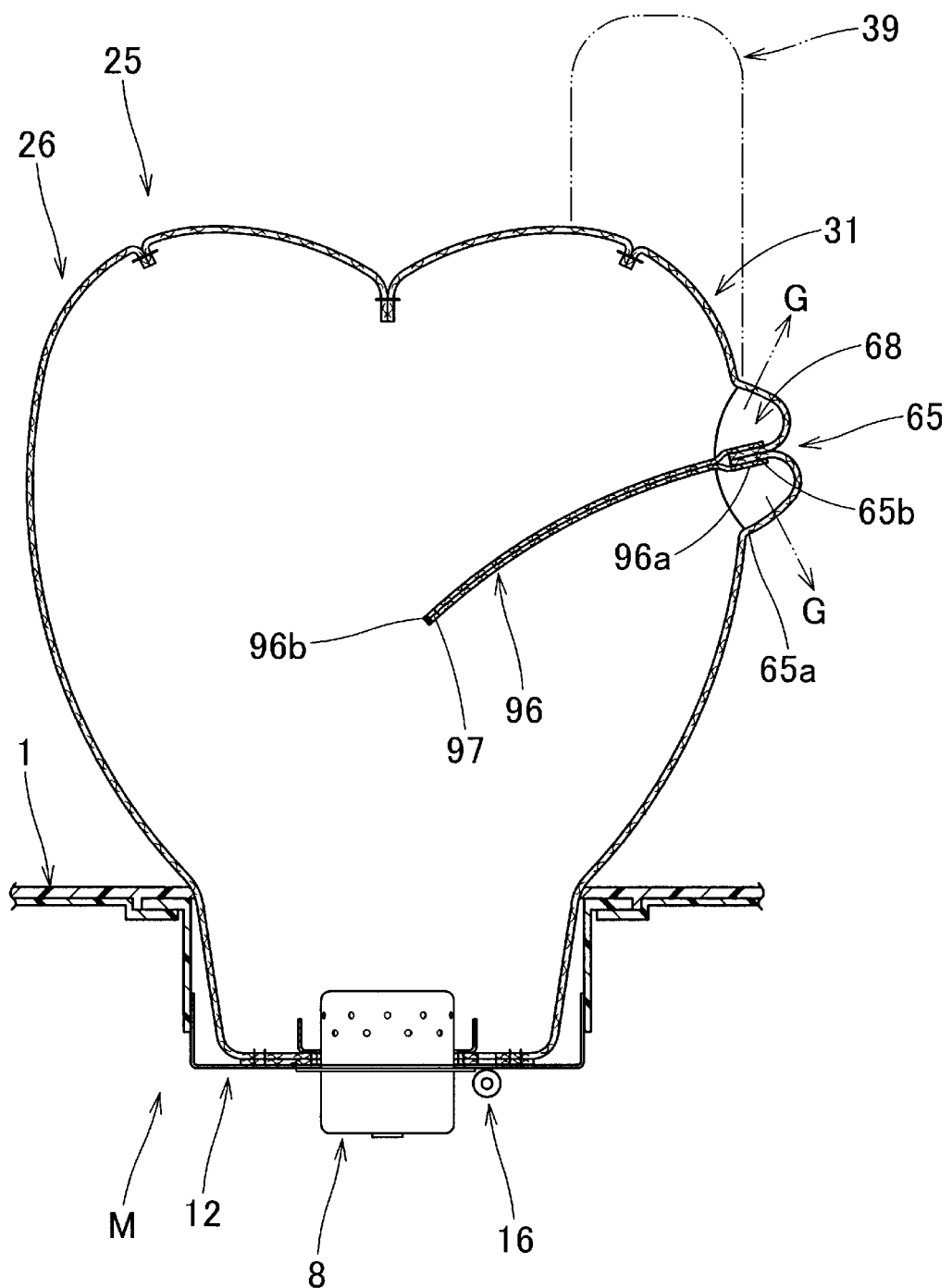
FIG. 10 is a schematic horizontal sectional view of the airbag device taken along the front and rear direction, which shows the way the airbag is completely inflated in an open mode.
Figure 11A:
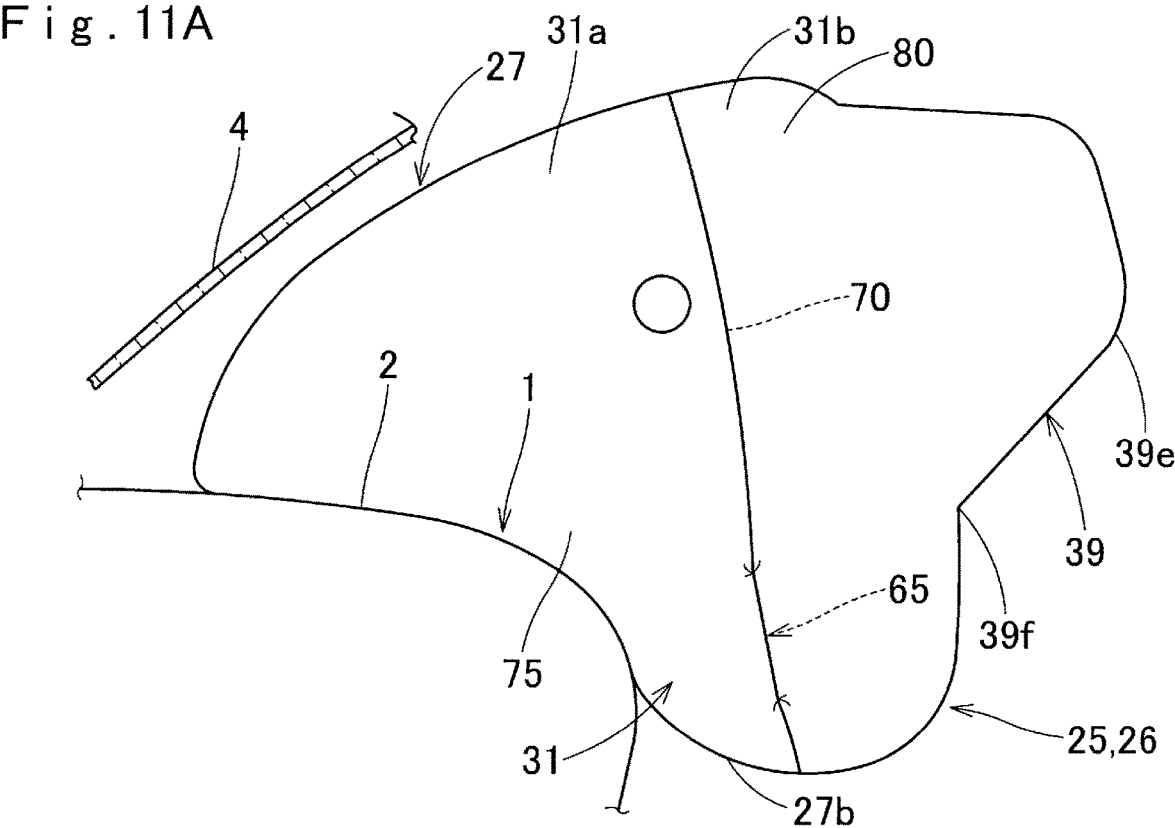
FIG. 11A is a schematic side view of the airbag device showing the way the airbag is completely inflated in the closed mode.
Figure 11B:
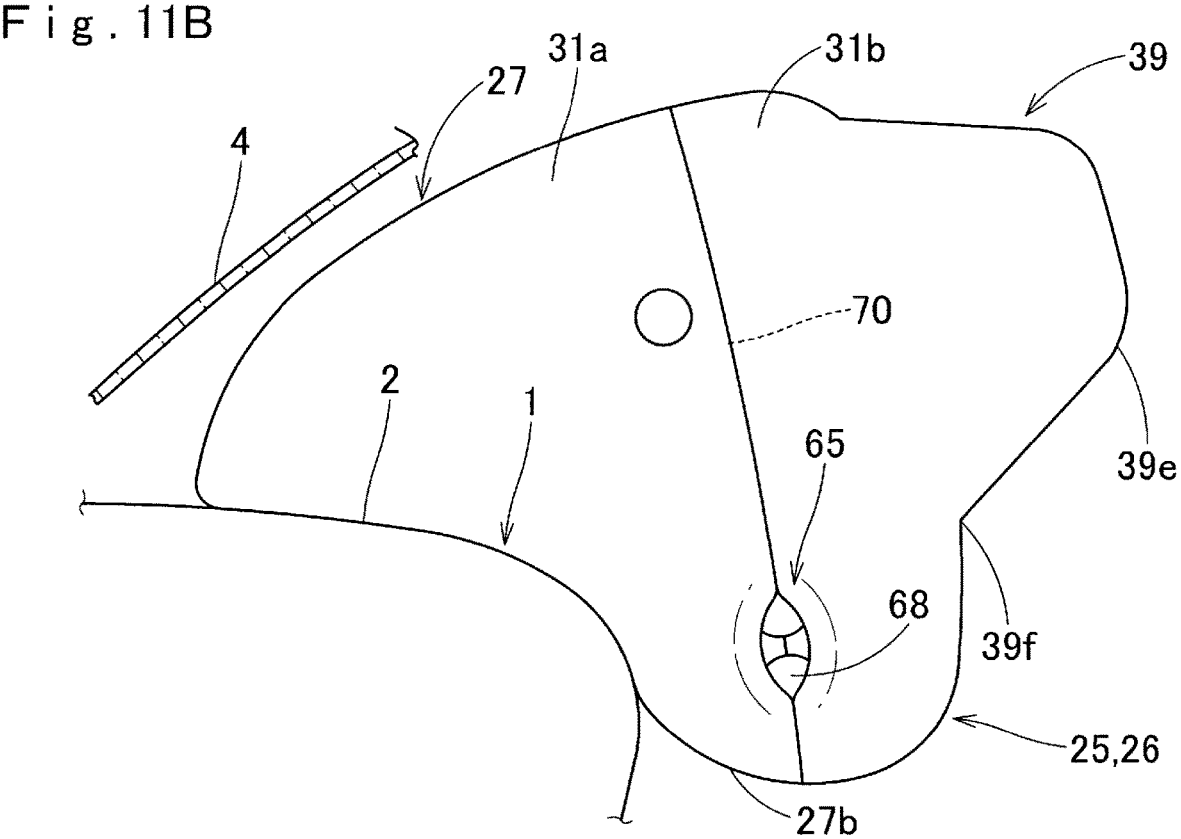
FIG. 11B is a schematic side view of the airbag device showing the way the airbag is completely inflated in the open mode.

In the illustrated embodiment, the exhaust portion 65 is disposed in the left side wall 31 on a side the protruding inflatable portion 39 is disposed, out of the left side wall (or first side wall) 31 and right side wall (or second side wall) 32 of the main inflatable portion 27 opposed to each other in the left and right direction. Specifically, in the left side wall 31, the exhaust portion 65 is disposed farther rearward than the vent hole 37, and farther downward than an apex 39*e* of the protruding inflatable portion 39, as viewed from a side of the airbag 25 as inflated. More specifically, the exhaust portion 65 is disposed not only farther downward than the apex 39*e* of the protruding inflatable portion 39 but also farther downward than a starting point 39*f* of protrusion of the protruding inflatable portion 39 positioned at the lower end of the protruding inflatable portion 39, as can be seen in FIGS. 11A and 11B. The exhaust portion 65 is integral with the bag body 26, and includes an exhaust hole 68 via which an inflation gas G is exhausted. The exhaust portion 65 is designed to stay drawn in (pulled in) the bag body 26 as shown in FIG. 9 when the bag body 26 is inflated with the connecting member 96 anchored by the retaining member 16, and designed to become freed from restraint by the connecting member 96 and protrude from the bag body 26 as shown in FIG. 10 when the bag body 26 is inflated with the connecting member 96 released from the retaining member 16. The exhaust portion 65 has a generally rectangular outer shape as unfolded and viewed from a side, and includes two side walls 66 and 67 each of which is formed continuous with a front region 31*a*/a rear region 31*b* of the left side wall 31, as described below. The side walls 66 and 67 are generally identical in outer shape. The exhaust portion 65 is formed by jointing a portion in a leading end 65*b* of the side wall 66 and a portion in a leading end 65*b* of the side wall 67 together, with the connecting member 96. In the exhaust portion 65, areas of the side walls 66 and 67 except the joined portion (i.e. seam 98, as described later) to the connecting member 96 are not attached (joined) together. When the bag body 26 is inflated with the connecting member 96 released from the retaining member 16, the exhaust portion 65 protrudes from the bag body 26 in an upturned state. The unjoined portions of the side walls 66 and 67 constitute the exhaust hole 68. In the exhaust portion 65 of the illustrated embodiment, a generally linear region of the side walls 66 and 67 continuing from a later-described joint 70 in a vicinity of a root region 65*a* (in a vicinity of the border between the left side wall 31 and exhaust portion 65) press against each other, thus sealed, therefore escape of gas is prevented.

The connecting member 96 which connects the exhaust portion 65 to the retaining member 16 is prepared separate from the bag body 26, from a band shaped cloth member having flexibility. The connecting member 96 of the illustrated embodiment has a two-ply structure of two base cloths (FIG. 7), and sandwiches the leading end 65*b* of the exhaust portion 65, as shown in FIG. 5. The connecting member 96 is formed by joining the two base cloths together with sewing threads over an entire length except the leading end 96*b*, thus forming a seam 98. The seam 98 sews (joins) the root region 96*a* of the connecting member 96 to the leading end 65*b* of the exhaust portion 65. The connecting member 96 is provided with a retaining hole 97 for receiving the anchor pin 17 of the retaining member 16 at the leading end 96*b*. The length of the connecting member 96 is so determined as to allow the airbag 25 to be inflated smoothly even in a closed mode in which the connecting member 96 is kept in engagement with the anchor pin 17 such that the exhaust portion 65 stays drawn in inside the bag body 26. The airbag device M of the illustrated embodiment is configured such that the airbag 25 is inflated with the exhaust portion 65 pulled in inside the bag body 26 in the closed mode in which the connecting member 96 is kept in engagement with, thus anchored by the retaining member 16. In this instance, the side walls 66 and 67 constituting a circumference of the exhaust hole 68 are subjected to an internal pressure of an inflation gas fed to the bag body 26 and press against each other, such that the exhaust hole 68 is held from opening, as shown in FIGS. 9 and 11A. When the airbag 25 is inflated in an open mode in which the connecting member 96 is released from the retaining member 16, the exhaust portion 65 is freed from restraint by the connecting member 96 and protrudes from the bag body 26 in an upturned state, as shown in FIGS. 10 and 11B, such that the exhaust hole 68 opens.

Figure 6:
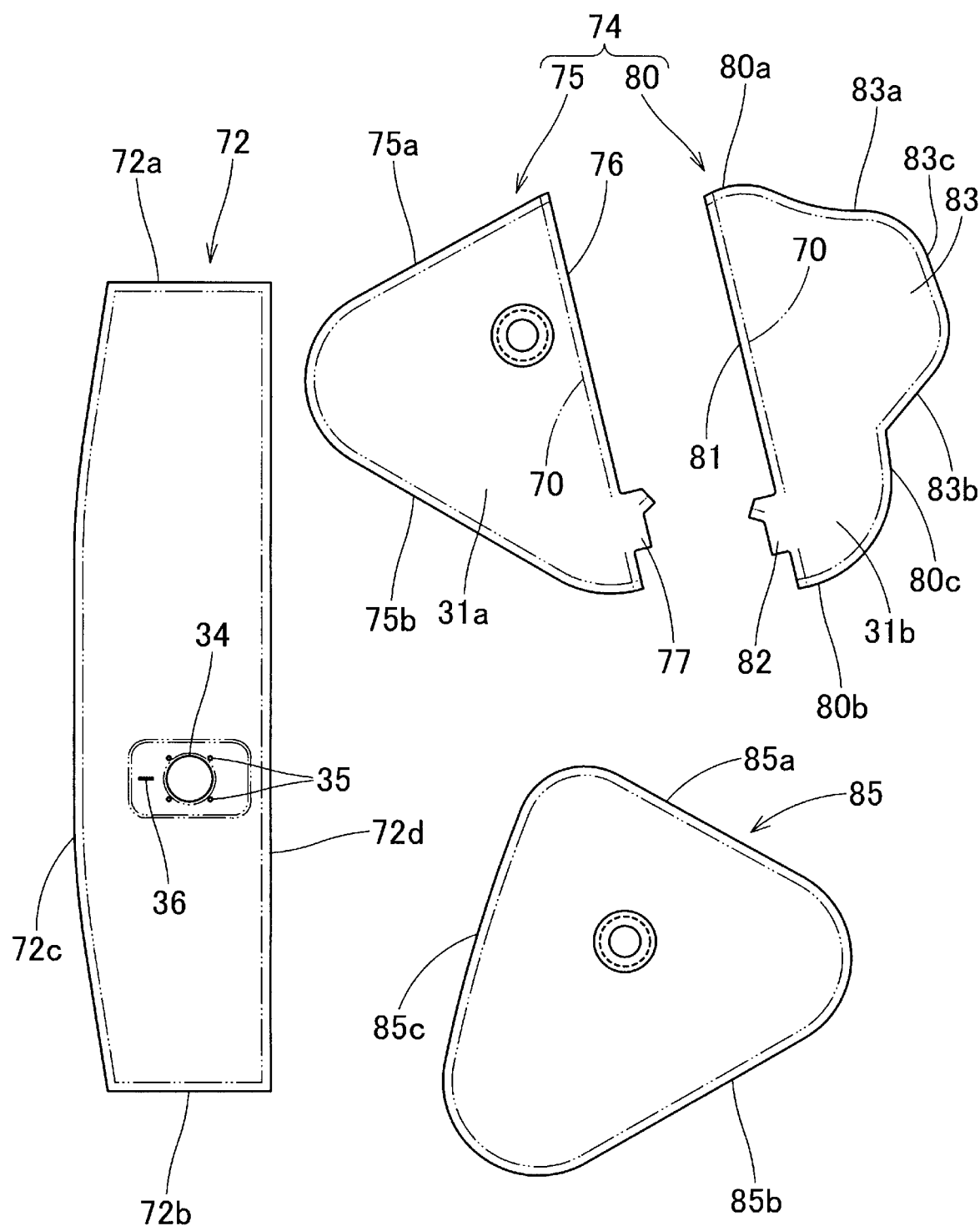
FIGS. 6 and 7 depict base members of the airbag of FIG. 3 in plan.

The bag body 26 is formed by sewing together circumferential edges of predetermined shaped base members. In the illustrated embodiment, as shown in FIGS. 6 and 7, the bag body 26 is composed of six base members; a left panel 74, a right panel 85, a protruding-portion forming panel 92, a front panel 72, a rear left panel 87 and a rear right panel 90.

The front panel 72 is formed into a generally band shape extending generally in the front and rear direction. The front panel 72 forms a region of the main inflatable portion 27 extending from the upper wall 29 to the lower wall 30. In the illustrated embodiment, the front panel 72 is bilaterally asymmetric with a bulging left edge 72*c*.

The left panel 74 forms the left side wall 31 of the main inflatable portion 27 and the protruding inflatable portion 39. The left panel 74 is composed of two split parts split in the front and rear direction, a front section 75 and a rear section 80, as shown in FIGS. 6, 11A and 11B. The front section 75 forms a portion on a side towards the inlet port 34 in the left side wall 31, while the rear section 80 forms a portion on a side towards the rear side wall 38. In the illustrated embodiment, the front section 75 and rear section 80 constitute a pair of sidewall components which constitute the left side wall 31. The rear section 80 is provided with a protruding-portion forming section 83 which forms the left side wall 39*a* of the protruding inflatable portion 39. The right panel 85 forms the right side wall 32 of the main inflatable portion 27.

The front section 75 is provided with an exhaust-portion forming section 77 which protrudes from the rear edge 76 partially and forms a side wall 67 of the exhaust portion 65. The rear edge 76 of the front section 75 constitutes a sidewall forming edge that constitutes the left side wall 31. The exhaust-portion forming section 77 is formed into a generally rectangle elongated in the up and down direction. The rear section 80 is provided with an exhaust-portion forming section 82 which protrudes from the front edge 81 partially and forms a side wall 66 of the exhaust portion 65. The front edge 81 of the rear section 80 constitutes a sidewall forming edge that constitutes the left side wall 31. The front edge 81 of the rear section 80 including the exhaust-portion forming section 82 is identical in outer contour with the rear edge 76 of the front section 75 when placed together with outside surfaces facing each other. In the rear section 80 as laid flat, the exhaust-portion forming section 82 is located disposed farther downward than the protruding-portion forming section 83. In the airbag 25 of the illustrated embodiment, a seam 70 that joins the rear edge 76 of the front section 75 and the front edge 81 of the rear section 80 except the position of the exhaust portion 65 is disposed in an area of the left side wall 31. The seam 70 extends generally along the up and down direction as viewed from a side of the airbag 25 as inflated, as shown in FIGS. 11A and 11B.

The rear left panel 87 and rear right panel 90 respectively form a left side and a right side of a rear surface (i.e. rear side wall 38) of the main inflatable portion 27 as inflated. Each of the rear left panel 87 and rear right panel 90 is formed into a band shape extending generally along the up and down direction. Each of the rear left panel 87 and rear right panel 90 is provided with an extended region 87e/90e for forming the rear section 53 of the front-rear tether 51, in the right edge 87d/left edge 90c. The rear left panel 87, which is to adjoin the protruding inflatable portion 39, further includes a recess-forming region 88 which protrudes from an upper end portion of the left edge 87c partially for forming the right side wall 48 of the arresting recess 45. The recess-forming region 88 is provided with a connection tab 88d to which the rear end 57b of the recess-pulling tether 57 is joined, in the front edge 88c.

The protruding-portion forming panel 92 forms the oblique-collision arresting plane 44, i.e. the right side wall 39b of the protruding inflatable portion 39. The protruding-portion forming panel 92 is formed generally into a trapezoid which is generally identical with the protruding-portion forming section 83 of the rear section 80 of the left panel 74. The protruding-portion forming panel 92 includes a recess-forming region 93 which protrudes from the front edge partially for forming the left side wall 47 of the arresting recess 45. The recess-forming region 93 is provided with a connection tab 93d to which the rear end 57b of the recess-pulling tether 57 is joined, in the front edge 93c.

In the illustrated embodiment, components of the bag body 26, i.e. the left panel 74 (front section 75 and rear section 80), right panel 85, protruding-portion forming panel 92, front panel 72, rear left panel 87, rear right panel 90, and base members 60 of the front-rear tether 51 and recess-pulling tether 57, are made of a flexible woven fabric of polyester yarns, polyamide yarns or the like.

As shown in FIGS. 6 and 7, the bag body 26 is formed into a bag having the exhaust portion 65 by sewing (i.e. joining) together corresponding circumferential edges of the left panel 74 (front section 75 and rear section 80), right panel 85, protruding-portion forming panel 92, front panel 72, rear left panel 87, rear right panel 90, with sewing threads.

To describe more specifically, the left panel 74 is formed by joining the rear edge 76 of the front section 75 and front edge 81 of the rear section 80 with the seam 70. The rear upper edge 72a of the front panel 72 is joined to the upper edges 87a and 90a of the rear left panel 87 and rear right panel 90, and the rear lower edge 72b is joined to the lower edges 87b and 90b of the rear left panel 87 and rear right panel 90. The left edge 72c of the front panel 72 is joined to the upper edges 75a, 80a to the lower edges 75b, 80b of the front section 75 and rear section 80 of the left panel 74, and the right edge 72d of the front panel 72 is joined to the upper edge 85a to the lower edge 85b of the right panel 85. The left edge 87c of the rear left panel 87 is joined to the rear edge 80c of the rear section 80 of the left panel 74. The right edge 87d of the rear left panel 87 is joined to the left edge 90c of the rear right panel 90. The right edge 90d of the rear right panel 90 is joined to the rear edge 85c of the right panel 85. The upper edge 83a, lower edge 83b and rear edge 83c of the protruding-portion forming section 83 in the left panel 74 are respectively joined to the upper edge 92a, lower edge 92b and rear edge 92c of the protruding-portion forming panel 92. The upper edge 88a, lower edge 88b and front edge 88c of the recess-forming region 88 in the rear left panel 87 are respectively joined to the upper edge 93a, lower edge 93b and front edge 93c of the recess-forming region 93 in the protruding-portion forming panel 92.

Mounting of the airbag device M on the vehicle V is now described. Firstly, the retainer 9 is housed inside the airbag 25, and the airbag 25 is folded up for storage in the case 12. Then a breakable wrapping sheet (not shown) is wrapped around the airbag 25 for keeping the folded-up configuration. At this time, the leading end 96b region of the connecting member 96, which extends from the exhaust portion 65, is taken out of the insertion hole 36 of the bag body 26. Then the airbag 25 is placed on the bottom wall 13 of the case 12 which has been provided with the retaining member 16, such that the bolts 9a go through the bottom wall 13, and the connecting member 96 is put through the through hole 13a in the bottom wall 13. Then the anchor pin 17 of the retaining member 16 is put through the retaining hole 97 of the connecting member 96, then the leading end of the anchor pin 17 is brought into engagement with the support bracket 19. Thus the leading end 96b of the connecting member 96 is anchored by the retaining member 16. Subsequently, the main body 8a of the inflator 8 is set in the case 12 from the lower side of the bottom wall 13, such that the bolts 9a of the retainer 9 projecting downwardly from the bottom wall 13 are put through the flange 8c of the inflator 8. If then the bolts 9a projecting from the flange 8c of the inflator 8 are fastened with nuts 10, the airbag 25 and the inflator 8 are mounted on the case 12.

Thereafter, the circumferential wall 14 of the case 12 is attached to the joint wall 6c of the airbag cover 6 on the dashboard 1, which has been mounted on board, and the not-shown brackets of the case 12 are secured to the vehicle body structure. If then the inflator 8 and the retaining member 16 are electrically connected to the control device 100, the airbag device M is mounted on the vehicle V.

After the airbag device M of the illustrated embodiment was mounted on the vehicle V, in the event of a frontal collision, an oblique collision or an offset collision of the vehicle V, the control device 100 feeds an actuating signal to the inflator 8, such that the inflator 8 discharges an inflation gas from the gas discharge ports 8b to inflate the airbag 25. Then the airbag 25 is inflated and pushes and opens the doors 6a and 6b of the airbag cover 6, protrudes upward from the case 12 via an opening formed by the opening of the doors 6a and 6b, and is deployed rearward and completes inflation in such a manner as to fill the space between the top plane 2 of the dashboard 1 and the windshield 4, as indicated by double-dotted lines in FIG. 1 and as shown in FIG. 11A.

In the airbag device M of the illustrated embodiment, the airbag 25 includes the protruding inflatable portion 39 that partially protrudes rearward from a first end region in the left and right direction (the left end region, in the illustrated embodiment) of the upper region of the rear portion, as shown in FIG. 8. The airbag 25 further includes, in the left side wall 31 on the side the protruding inflatable portion 39 is disposed, the exhaust portion 65 having the exhaust hole 68 that is controlled to open or close by the retaining member (i.e. the open/close control device) 16. The exhaust portion 65 is located farther downward than the apex 39e of the protruding inflatable portion 39 as viewed from a side of the airbag 25 as inflated, as shown in FIGS. 11A and 11B. That is, the exhaust portion 65 and protruding inflatable portion 39 are located at a distance from each other in the up and down direction, as viewed from the side. With this configuration, when the airbag 25 is inflated with the exhaust portion 65 protruding and exhaust hole 68 exhausting an inflation gas as shown in FIG. 10, although the protrusion of the exhaust portion 65 causes an increase of film length in an area the exhaust portion 65 is disposed, this does not affect the area where the protruding inflatable portion 39 is disposed, such that the protruding inflatable portion 39 is able to protrude rearward quickly from the rear portion of the main inflatable portion 27 (i.e. from the rear side wall 38) with little oscillation in the left and right direction. Further, in the airbag device M of the illustrated embodiment, the exhaust portion 65 is located in an area of the airbag 25 as inflated which is disposed father downward than the protruding inflatable portion 39 and to be supported by the dashboard 1 (i.e. a peripheral region of the case 12) by the front surface, as shown in FIGS. 11A and 11B. When the airbag 25 is inflated with the exhaust portion 65 protruding, a lower portion 27b of the main inflatable portion 27, where the exhaust portion 65 is disposed, is increased in film length by protrusion of the exhaust portion 65. The increase in film length may cause oscillation in the left and right direction in the lower portion 27b of the main inflatable portion 27 during airbag deployment, but the lower portion 27b will be prevented from rebounding due to the support by the dashboard 1, thus prevented from further continuous oscillation. Therefore, the airbag 25 will be able to be inflated into a complete inflated shape quickly.

With the airbag device M of the illustrated embodiment, the airbag 25 is able to adequately arrest the head MH of the occupant MP who moves diagonally forward with the protruding inflatable portion 39, in the event of an oblique collision or an offset collision of the vehicle V. More specifically, in the airbag 25 as inflated, the rear portion (i.e. the rear side wall 38) of the main inflatable portion 27 serves as the front-collision arresting plane 43 for protecting the head MH in the event of a frontal collision of the vehicle V, and the right side wall 39b of the protruding inflatable portion 39 which is continuous with the rear side wall 38 of the main inflatable portion 27 serves as the oblique-collision arresting plane 44 for protecting the head MH which moves diagonally forward. Further, the arresting recess 45 which is recessed forward is formed between the front-collision arresting plane 43 and oblique-collision arresting plane 44. With this configuration, in the event of an oblique collision or an offset collision, the airbag 25 is able to protect the head MH of the occupant MP adequately by catching the head MH with the oblique-collision arresting plane 44 first and guiding it into the arresting recess 45, as indicated with double-dotted lines in FIG. 8.

Therefore, the airbag device M of the exemplary embodiment is able to protect the head MH of the occupant MP with the protruding inflatable portion 39 in a steady fashion although the airbag 25 is configured to be controllable in internal pressure and includes the protruding inflatable portion 39 which protrudes partially.

To describe more specifically, in the airbag device M of the exemplary embodiment, the retaining member 16 which anchors the leading end 96b of the connecting member 96 extending from the exhaust portion 65 constitutes the open/close control device which controls opening and closing of the exhaust hole 68. If the control device 100, which is electrically connected with the predetermined sensors 101, 102, 103, detects a small occupant MP1 sitting or an occupant MP sitting in proximity to the dashboard 1, it feeds an actuating signal to the actuator 18 of the retaining member 16 as well as the inflator 8, such that the retaining member 16 operates to retract the anchor pin 17. Then the airbag 25 is inflated in the open mode in which the exhaust portion 65 protrudes from the bag body 26 and the exhaust hole 68 is opened, as shown in FIGS. 10 and 11B, thus the airbag 25 completes inflation with an extra inflation gas exhausted, i.e. with the internal pressure suppressed. Therefore, the airbag 25 with the suppressed internal pressure is able to protect the small occupant MP1 or occupant MP sitting in proximity to the dashboard 1 softly.

To the contrary, if the control device 100 detects a large occupant MP2 sitting or an occupant MP sitting at a sufficient distance from the dashboard 1, it does not feed an actuating signal to the actuator 18, such that the airbag 25 is inflated in the closed mode in which the exhaust portion 65 stays drawn in (pulled in) and the side walls 66 and 67 constituting the circumference of the exhaust hole 68 are pressed against each other such that the exhaust hole 68 is prevented from opening. With the exhaust hole 68 closed as shown in FIGS. 9 and 11A, the airbag 25 completes inflation with a sufficient internal pressure and an adequate cushioning property. Accordingly, the airbag 25 is able to protect the large occupant MP2 or occupant MP sitting at a distance from the dashboard 1 without a fear of bottoming-out.

As shown in FIGS. 11A and 11B, in the airbag device M of the exemplary embodiment, the exhaust portion 65 is located farther downward than the starting point 39f of protrusion of the protruding inflatable portion 39, as viewed from a side of the airbag 25 as deployed. Thus the exhaust portion 65 and protruding inflatable portion 39 are certainly located apart from each other in the up and down direction, when viewed from a side.

Moreover, in the airbag device M of the exemplary embodiment, the left side wall 31 in which the exhaust portion 65 is disposed is composed of a pair of sidewall components (i.e. the front section 75 and rear section 80). Each of the sidewall components (i.e. the front section 75 and rear section 80) is formed of a sheet material having flexibility, and includes the sidewall-forming edge (i.e. the rear edge 76/the front edge 81) and the exhaust-portion forming section 77/82 that protrudes partially from the side-wall forming edge 76/81 for forming the exhaust portion 65. The left side wall 31 and exhaust portion 65 is formed by joining the sidewall-forming edges 76 and 81 of the sidewall components (i.e. the front section 75 and rear section 80) together. That is, the left side wall 31 of the bag body 26 and the exhaust portion 65 which is capable of protruding from the left side wall 31 can be formed by a planar joining work, and the exhaust portion 65 can be formed integrally with the bag body 26 in a simple fashion.

In the airbag 25 of the foregoing embodiment, the left side wall 31 provided with the exhaust portion 65 is composed of the front section 75 and rear section 80 which are split in the front and rear direction such that the seam 70 joining the rear edge 76 and front edge 81 of the front and rear sections 75 and 80 together extends generally along the up and down direction at airbag deployment. Alternatively, the left side wall provided with the exhaust portion may be configured of split parts which are split in the up and down direction, as in an airbag 25A depicted in FIGS. 12 and 14.

Figure 12:
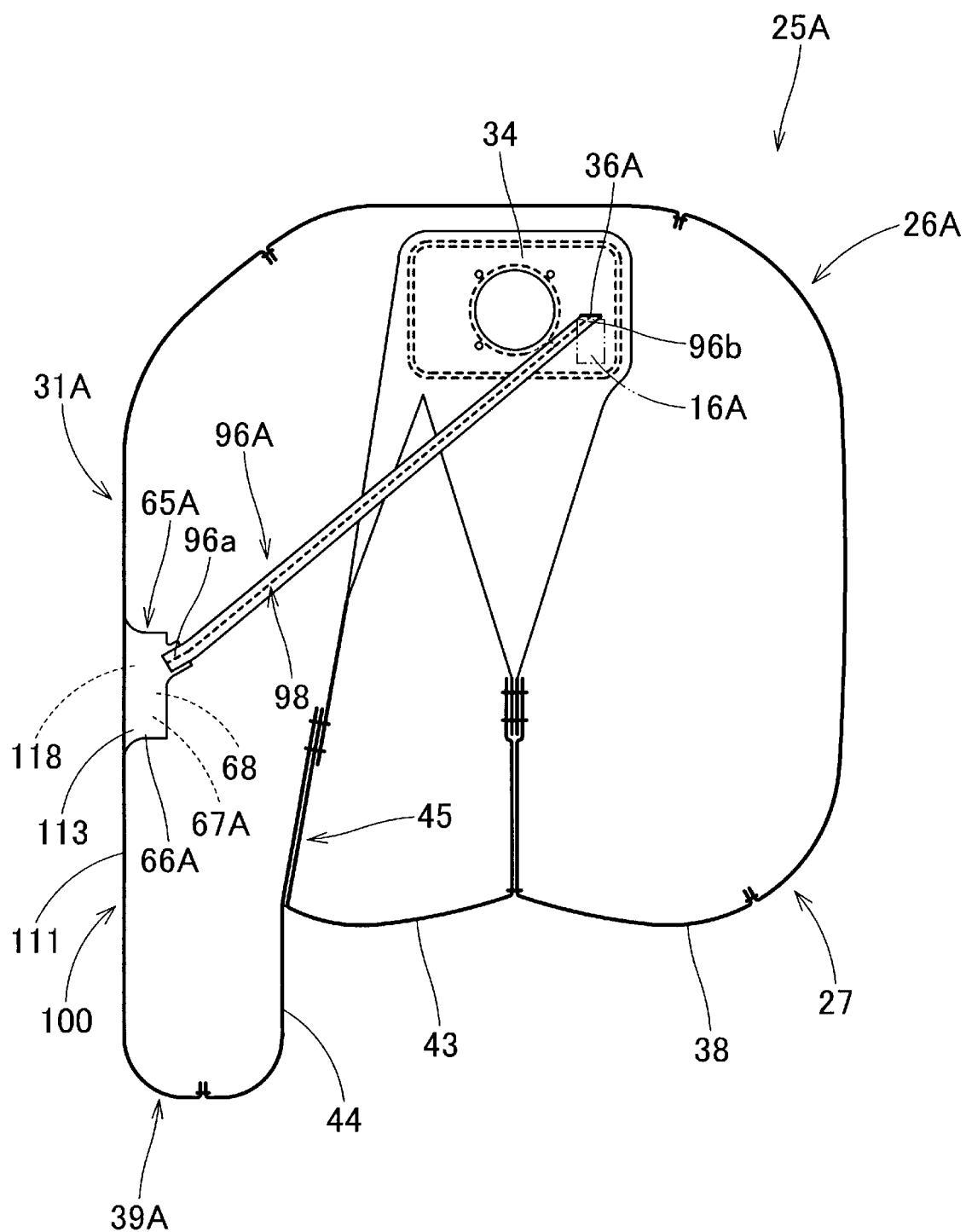
FIG. 12 is a schematic horizontal sectional view of an airbag in accordance with an alternative embodiment.

The airbag 25A depicted in FIGS. 12 and 14 has the same configuration as the airbag 25 of the foregoing embodiment except in configuration of a left panel 110 forming a left side wall 31A. Therefore, common members will be each given a same reference numeral, and detailed descriptions of those members will be omitted. In the airbag 25A, as can be seen in FIG. 14, a protruding inflatable portion 39A has a greater dimension in an up and down direction than the protruding inflatable portion 39 of the foregoing embodiment.

Figure 13:
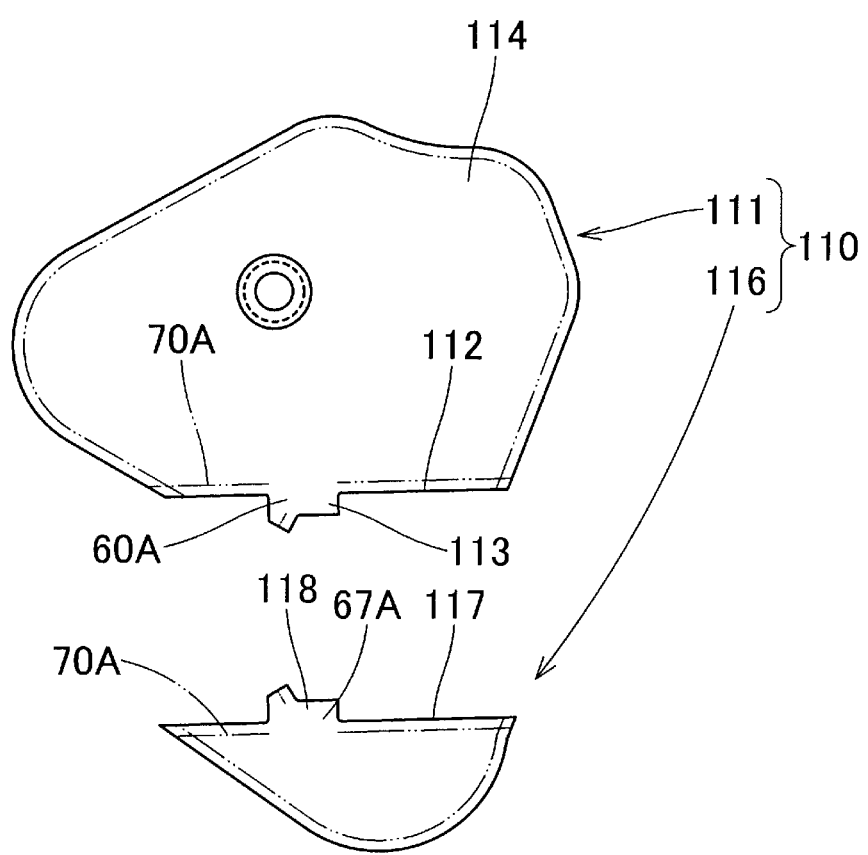
FIG. 13 depicts a left panel out of base members of the airbag of FIG. 12 in plan.

As shown in FIG. 13, the left panel 110 forming the left side wall 31A of the airbag 25A is composed of two split parts split in an up and down direction, an upper section 111 and a lower section 116. The upper section 111 and lower section 116 constitute a pair of sidewall components that constitute the left side wall 31A. The left panel 110 is split into the upper section 111 and lower section 116 at a vicinity of the lower end of the left side wall 31A of the airbag 25 as fully inflated. The upper section 111 is provided with a protruding-portion forming section 114 which forms a left side wall 39a of the protruding inflatable portion 39A.

The upper section 111 is provided with an exhaust-portion forming section 113 which protrudes from the lower edge 112 partially and forms a side wall 66A of the exhaust portion 65A. The lower edge 112 of the upper section 111 constitutes a sidewall forming edge that constitutes the left side wall 31A. The exhaust-portion forming section 113 is formed into a generally rectangle elongated in a front and rear direction. In the upper section 111 as laid flat, the exhaust-portion forming section 113 is located farther downward than the protruding-portion forming section 114. The lower section 116 is provided with an exhaust-portion forming section 118 which protrudes from the upper edge 117 partially and forms a side wall 67A of the exhaust portion 65A. The upper edge 117 of the lower section 116 constitutes a sidewall forming edge that constitutes the left side wall 31A. The upper edge 117 of the lower section 116 including the exhaust-portion forming section 118 is identical in outer contour with the lower edge 112 of the upper section 111 when placed together with outside surfaces facing each other. In the airbag 25A, a seam 70A that joins the lower edge 112 of the upper section 111 and the upper edge 117 of the lower section 116 except the position of the exhaust portion 65A is disposed in an area of the left side wall 31A. The seam 70A extends generally along the front and rear direction as viewed from a side of the airbag 25A as inflated. In the airbag 25A, as shown in FIG. 14, the exhaust portion 65A is disposed generally at the same position as a starting point 39f of protrusion of the protruding inflatable portion 39A positioned at the lower end of the protruding inflatable portion 39A, and farther downward than an apex 39e of the protruding inflatable portion 39A. In the airbag 25A, as shown in FIG. 12, an insertion hole 36A for receiving a connecting member 96A which extends from a leading end 65b of the exhaust portion 65A is formed on a side apart from the protruding inflatable portion 39A with respect to the inlet port 34, i.e. on the right side of the inlet port 34, in a vicinity of the inlet port 34. The leading end 96b of the connecting member 96A is put through the insertion hole 36A to be connected to a retaining member 16A which is disposed on the right side of the inflator when mounted on board, as shown in FIG. 12.

Figure 14A:
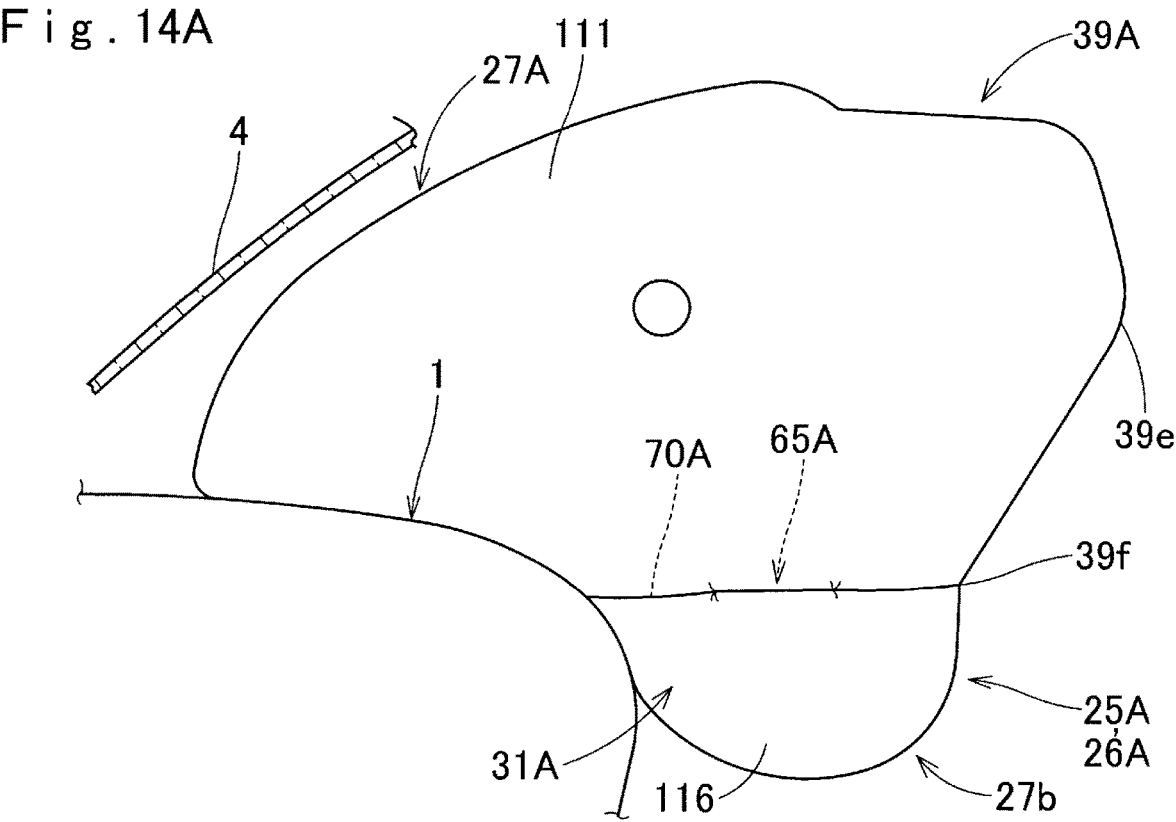
FIG. 14A is a schematic side view of an airbag device provided with the airbag of FIG. 12, which shows the way the airbag is completely inflated in a closed mode.
Figure 14B:
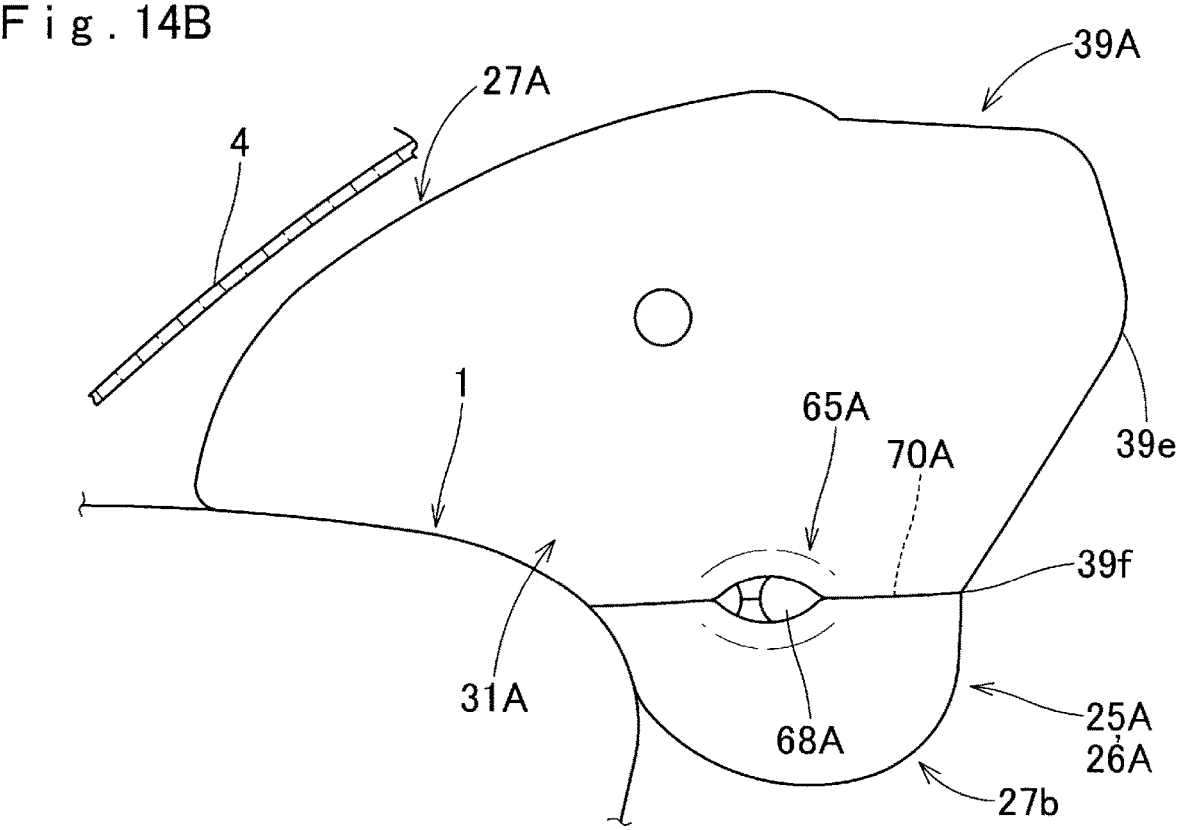
FIG. 14B is a schematic side view of the airbag device provided with the airbag of FIG. 12, which shows the way the airbag is completely inflated in an open mode.

In an airbag device provided with the airbag 25A configured as described above, when the airbag 25A is inflated with the connecting member 96A kept anchored by the retaining member 16A, the exhaust portion 65A is disposed generally along the front and rear direction in a lower portion of the main inflatable portion 27 as shown in FIG. 14A. Since the leading end 96b of the connecting member 96A is connected to the not-shown retaining member 16A which is located on the side apart from the protruding inflatable portion 39A, i.e. apart from the exhaust portion 65A, with respect to the inlet port 34, in other words, on the right side of the inlet port 34, the connecting member 96A is disposed diagonally to a pressed area of the side walls 66A and 67A of the exhaust portion 65A in which the side walls 66A and 67A are pressed against each other, not in parallel to the pressed area which is elongated in the front and rear direction, as shown in FIG. 12. With this configuration, a pulling force of the connecting member 96A acts uniformly on a front portion and a rear portion of the circumference of the exhaust hole 68A of the exhaust portion 65A when the bag body 26A is inflated with the connecting member 96A anchored by the retaining member. Therefore, the exhaust portion 65A with the side walls 66A and 67A pressed against each other is steadily drawn in inside the bag body 26A over a generally entire area in the front and rear direction, such that the closed state of the exhaust portion 65A is steadily maintained. On the other hand, when the connecting member 96A is released from the retaining member, the exhaust portion 65A protrudes from the bag body 26A and the airbag 25A is inflated with an extra inflation gas exhausted from the exhaust hole 68A as opened, as shown in FIG. 14B. The configuration that the seam 70A is formed to extend generally along the front and rear direction may be suitably applied to the airbag 25A in which the protruding inflatable portion 39A is greater in width in the up and down direction than the airbag 25 of the foregoing embodiment and in which a lower portion of the main inflatable portion 27 is small, because the exhaust portion 65A is smaller in dimension in the up and down direction than the exhaust portion 65 of the foregoing embodiment.

The airbag device M of the exemplary embodiment is a top-mount airbag device for a passenger seat which is mounted on the top plane of the dashboard, in front of a passenger seat. The lower portion 27b of the main inflatable portion 27 provided with the exhaust portion 65 is located in an area which is disposed father downward than the protruding inflatable portion 39 and supported by the dashboard 1 by the front surface at airbag deployment, as shown in FIG. 11. With this configuration, when the airbag 25 is inflated with the exhaust portion 65 protruding, the lower portion 27b may oscillate in the left and right direction during deployment, but the lower portion 27b will be prevented from rebounding due to the support by the dashboard 1, thus prevented from further oscillatory motion. Therefore, the airbag 25 will be able to be inflated into a complete inflated shape at rest quickly even if the airbag 25 has a great volume or a great film length, thus suitable for a top-mount airbag device for a passenger seat whose storage (i.e. case 12) is mounted on the top plane of the dashboard.

The invention should not be limited to the top-mount airbag device for a passenger seat. The invention may also be applied, by way of example, to a mid-mount airbag device for a passenger seat, an airbag device for a steering wheel, or an airbag device adapted to be mounted in front of a rear seat.

What is claimed is:

1. An airbag device adapted to be mounted on a vehicle, the airbag device comprising:
   a storage;
   an airbag that is housed in the storage in a folded-up configuration and configured to be inflated with an inflation gas and emerge from the storage, the airbag comprising:
   a bag body that has flexibility, the bag body including an inlet port for admitting the inflation gas, and a peripheral region of the inlet port which is mounted on the storage;
   an exhaust portion that includes an exhaust hole which is configured to release a part of the inflation gas which has flown into the bag body; and
   a connecting member that is disposed inside the bag body and connected to the exhaust portion by a root portion thereof; and
   an open/close control device that is disposed in or in a vicinity of the storage and in a vicinity of the inlet port, a leading end portion of the connecting member being connected to the open-close control device in a disengageable fashion,
   wherein the bag body includes:
   a main inflatable portion that has the inlet port in a front end portion thereof as deployed, the main inflatable portion including a first and a second side walls which are configured to be opposed in a left and right direction at airbag deployment; and
   a protruding inflatable portion that is configured to partially protrude rearward from a first end region in the left and right direction of an upper region of a rear portion of the main inflatable portion as deployed for protecting a head of a vehicle occupant who moves diagonally forward in the event of an oblique collision or an offset collision of the vehicle;
   wherein the open/close control device is configured either to keep the exhaust hole of the exhaust portion closed during airbag deployment by keeping holding the connecting member such that the connecting member pulls in the exhaust portion inside the bag body such that walls in a circumference of the exhaust hole are pressed against each other so as to keep the exhaust hole closed, or to open the exhaust hole by releasing the connecting member such that the exhaust portion protrudes from the bag body and the exhaust hole is opened; and
   wherein the exhaust portion is formed in the first side wall of the main inflatable portion on a side the protruding inflatable portion is disposed, and is positioned farther downward than an apex of the protruding inflatable portion, as viewed from a side of the airbag as deployed.

2. The airbag device of claim 1, wherein the storage is configured to be adapted to be mounted on a top plane of an instrument panel of the vehicle, in front of a passenger seat.

3. The airbag device of claim 1, wherein the exhaust portion is located farther downward than a starting point of protrusion of the protruding inflatable portion, as viewed from the side of the airbag as deployed.

4. The airbag device of claim 1, wherein:
   the first side wall of the main inflatable portion provided with the exhaust portion is composed of a pair of sidewall components each of which is formed of a sheet material having flexibility;
   each of the sidewall components includes a sidewall-forming edge and an exhaust-portion forming section that protrudes partially from the sidewall-forming edge for forming the exhaust portion; and
   the first side wall and the exhaust portion are formed by joining the sidewall-forming edges of the sidewall components together.

5. The airbag device of claim 4, wherein a seam that joins the sidewall-forming edges of the sidewall components together is configured to extend generally along an up and down direction at airbag deployment.

6. The airbag device of claim 4, wherein:
   a seam that joins the sidewall-forming edges of the sidewall components together is configured to extend generally horizontally at airbag deployment; and
   the open/close control device to which the leading end portion of the connecting member is connected is located on a side apart from the protruding inflatable portion with respect to the inlet port of the airbag.

7. The airbag device of claim 1, wherein the bag body as deployed includes:
   a front-collision arresting plane that is disposed in a rear surface of the main inflatable portion for protecting the head of the vehicle occupant which moves forward in the event of a frontal collision of the vehicle;
   an oblique-collision arresting plane that is disposed in a side wall of the protruding inflatable portion which side wall is continuous with the front-collision arresting plane, the oblique-collision arresting plane being configured to protect the head which moves diagonally forward in the event of an oblique collision or an offset collision of the vehicle; and
   an arresting recess that is recessed forward between the front-collision arresting plane and oblique-collision arresting plane for receiving and arresting the head therein.

* * * * *